(12) United States Patent
Lin et al.

(10) Patent No.: US 11,605,156 B2
(45) Date of Patent: *Mar. 14, 2023

(54) ITERATIVE IMAGE INPAINTING WITH CONFIDENCE FEEDBACK

(71) Applicant: ADOBE INC., San Jose, CA (US)

(72) Inventors: Zhe Lin, Fremont, CA (US); Yu Zeng, Liaoning (CN); Jimei Yang, Mountain View, CA (US); Jianming Zhang, Campbell, CA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,639

(22) Filed: Jul. 14, 2022

(65) Prior Publication Data
US 2022/0366546 A1    Nov. 17, 2022

Related U.S. Application Data

(63) Continuation of application No. 16/861,548, filed on Apr. 29, 2020, now Pat. No. 11,398,015.

(51) Int. Cl.
*G06T 5/00* (2006.01)
*G06N 3/04* (2023.01)
*G06N 3/08* (2023.01)

(52) U.S. Cl.
CPC ........... *G06T 5/005* (2013.01); *G06N 3/0454* (2013.01); *G06N 3/08* (2013.01); *G06T 2207/20081* (2013.01); *G06T 2207/20084* (2013.01)

(58) Field of Classification Search
CPC .......... G06N 20/00; G06N 7/005; G06N 3/08; G06N 3/0454; G06N 5/04; G06N 20/20;
(Continued)

(56) References Cited

U.S. PATENT DOCUMENTS 10,540,757 B1 * 1/2020 Bouhnik ............... G06T 3/4084
2011/0057933 A1 * 3/2011 Lyashevsky ......... H04N 19/521
345/428

OTHER PUBLICATIONS

Bertalmio, M., et al., "Image Inpainting", In Proceedings of the 27th Annual conference on Computer Graphics and Interactive Techniques, pp. 1-12 (Jul. 2000).

(Continued)

*Primary Examiner* — Ajibola A Akinyemi
(74) *Attorney, Agent, or Firm* — Shook, Hardy & Bacon L.L.P.

(57) ABSTRACT

Methods and systems are provided for accurately filling holes, regions, and/or portions of images using iterative image inpainting. In particular, iterative inpainting utilize a confidence analysis of predicted pixels determined during the iterations of inpainting. For instance, a confidence analysis can provide information that can be used as feedback to progressively fill undefined pixels that comprise the holes, regions, and/or portions of an image where information for those respective pixels is not known. To allow for accurate image inpainting, one or more neural networks can be used. For instance, a coarse result neural network (e.g., a GAN comprised of a generator and a discriminator) and a fine result neural network (e.g., a GAN comprised of a generator and two discriminators). The image inpainting system can use such networks to predict an inpainting image result that fills the hole, region, and/or portion of the image using predicted pixels and generates a corresponding confidence map of the predicted pixels.

17 Claims, 11 Drawing Sheets

(58) Field of Classification Search
CPC ........ G06N 5/022; G06N 3/084; G06N 20/10;
G06N 3/0445; G06N 3/04; G06N 5/003;
G06N 5/025; G06N 5/02; G06N 3/006;
G06N 3/088; G06N 5/048; G06N 3/0472;
G06N 3/02; G06N 3/0481; G06N 5/045;
G06N 5/046; G06N 3/063; G06N 5/041;
G06N 5/027; G06N 5/047; G06N 7/00;
G06N 7/02; G06N 5/043; G06N 3/0427;
G06N 5/00; G06N 7/023; G06N 3/082
USPC .......................................................... 382/162
See application file for complete search history.

(56) References Cited

OTHER PUBLICATIONS

Everingham, M., et al., "The PASCAL Visual Object Classes (VOC) Challenge", International Journal of Computer Vision, vol. 88, No. 2, pp. 303-338 (2010).

Iizuka, S., et al., "Globally and Locally Consistent Image Completion", ACM Transactions on Graphics, vol. 36, No. 4, Article 107, pp. 1-14 (Jul. 2017).

Liu, G., et al., "Image Inpainting for Irregular Holes Using Partial Convolutions", In Proceedings of the European Conference on Computer Vision (ECCV), pp. 1-16 (2018).

Xiong, W., et al., "Foreground-aware Image Inpainting", Proceedings of the IEEE Conference on Computer Vision and Pattern Recognition, pp. 5840-5848 (2019).

Zeng, Y., et al., "High-Resolution Image Inpainting with Iterative Confidence Feedback and Guided Upsampling", arXiv:2005.11742v1, pp. 1-18 (May 24, 2020).

Ballester, C., et al., "Filling-In by Joint Interpolation of Vector Fields and Gray Levels", IEEE transactions on Image Processing, vol. 10, No. 8, pp. 1-22 (Apr. 8, 2000).

Drori, I., et al., "Fragment-Based Image Completion", ACM Transactions on Graphics (SIGGRAPH), vol. 22, Issue 3, pp. 303-312 (Jul. 2003).

Goodfellow, I. J., et al., "Generative Adversarial Nets", In Advances in Neural Information Processing Systems (NIPS), pp. 1-9 (2014).

Jiang, H., et al., "Salient Object Detection: A Discriminative Regional Feature Integration Approach", In Proceedings of the IEEE Conference On Computer Vision And Pattern Recognition, pp. 2083-2090 (2013).

Oh, S. W., et al., "Onion-Peel Networks for Deep Video Completion", In Proceedings of the IEEE International Conference on Computer Vision, pp. 4403-4412 (2019).

Yu, J., et al., "Generative Image Inpainting with Contextual Attention", In Proceedings of the IEEE Conference on Computer Vision and Pattern Recognition, pp. 5505-5514 (2018).

Zhang, H., et al., "Semantic Image Inpainting with Progressive Generative Networks", In Proceedings of the 26th ACM International Conference on Multimedia, Session: Deep-3 (Image Processing-Inpainting, Super-Resolution, Deblurring), Association for Computing Machinery, pp. 1939-1947 (Oct. 22-26, 2018).

Li, G., and Yu, Y., "Deep Contrast Learning for Salient Object Detection", In Proceedings of the IEEE Conference on Computer Vision and Pattern Recognition, pp. 478-487 (2016).

Barnes, C., et al., "PatchMatch: A Randomized Correspondence Algorithm for Structural Image Editing", ACM Transactions on Graphics, vol. 28, Issue 3, Article No. 24, pp. 1-10 (Aug. 2009).

Efros, A. A., and Freeman, W. T., "Image Quilting for Texture Synthesis and Transfer", In Proceedings of the 28th Annual Conference on Computer Graphics and Interactive Techniques (ACM SIGGRAPH), pp. 1-6 (Aug. 12-17, 2001).

Guo, Z., et al., "Progressive Image Inpainting with Full-Resolution Residual Network", In Proceedings of the 27th ACM International Conference on Multimedia, arXiv:1907.10478v3, pp. 1-9 (2019).

Liang, X., et al., "Deep Human Parsing with Active Template Regression", IEEE Transactions on Pattern Analysis and Machine Intelligence, vol. 37, No. 12, pp. 1-14 (2015).

Pathak, D., et al., "Context Encoders: Feature Learning by Inpainting", In Proceedings of the IEEE Conference on Computer Vision and Pattern Recognition, pp. 2536-2544 (2016).

Yu., J., et al., "Free-Form Image Inpainting with Gated Convolution", Proceedings of the IEEE International Conference on Computer Vision, pp. 4471-4480 (2019).

Caelles, S., et al., "The 2019 DAVIS Challenge on VOS: Unsupervised Multi-Object Segmentation", arXiv:1905.00737v1, pp. 1-4 (May 2, 2019).

Fan, D-P., et al., "Salient Objects in Clutter: Bringing Salient Object Detection to the Foreground", In Proceedings of the European Conference on Computer Vision (ECCV), pp. 1-17 (2018).

Isola, P., et al., "Image-to-Image Translation with Conditional Adversarial Networks", In Proceedings of the IEEE Conference on Computer Vision and Pattern Recognition, pp. 1125-1134 (2017).

Nazeri, K., et al., "EdgeConnect: Generative Image Inpainting with Adversarial Edge Learning", arXiv:1901.00212v3, pp. 1-17 (Jan. 11, 2019).

Yang, C., et al., "High-Resolution Image Inpainting using Multi-Scale Neural Patch Synthesis", In Proceedings of the IEEE Conference on Computer Vision and Pattern Recognition, pp. 6721-6729 (2017).

Zeng, Y., et al., "Learning Pyramid-Context Encoder Network for High-Quality Image Inpainting", In Proceedings of the IEEE Conference on Computer Vision and Pattern Recognition, pp. 1486-1494 (2019).

Kwatra, V., et al., "Texture Optimization for Example-based Synthesis", In ACM SIGGRAPH Papers, pp. 795-802 (2005).

* cited by examiner

ITERATIVE IMAGE INPAINTING WITH CONFIDENCE FEEDBACK

CROSS-REFERENCE TO RELATED APPLICATIONS

This application is a continuation application claiming the benefit of, and priority to, U.S. patent application Ser. No. 16/861,548, titled "ITERATIVE IMAGE INPAINTING WITH CONFIDENCE FEEDBACK" filed on Apr. 29, 2020, which is herein incorporated by reference in its entirety.

In an imaging environment, such as an imaging or a photograph editing application (e.g., Adobe® Photoshop®), image inpainting is a task of reconstructing regions in an image. For instance, in some cases, certain images are incomplete and result in portions of the image that are unclear, missing, and/or otherwise lack information. By way of example, images received over a network or captured via a camera may degrade and lack information for all pixels of the image resulting in unclear, blurry, and/or other incomplete pixels in images. These images include a number of undefined pixels where information for those respective pixels is not known (e.g., a hole) and a number of defined pixels where information for those respective pixels is known.

BACKGROUND

In an imaging environment, such as an imaging or a photograph editing application (e.g., Adobe® Photoshop®), image inpainting is a task of reconstructing regions in an image. For instance, in some cases, certain images are incomplete and result in portions of the image that are unclear, missing, and/or otherwise lack information. By way of example, images received over a network or captured via a camera may degrade and lack information for all pixels of the image resulting in unclear, blurry, and/or other incomplete pixels in images. These images include a number of undefined pixels where information for those respective pixels is not known (e.g., a hole) and a number of defined pixels where information for those respective pixels is known.

SUMMARY

Embodiments of the present disclosure are directed towards an iterative image inpainting system that performs iterative inpainting utilizing a confidence analysis during iterations of the inpainting result as a feedback mechanism. In accordance with embodiments of the present disclosure, the image inpainting system uses a confidence analysis during iterations to ensure that only high-confidence pixels are trusted in an iteration of inpainting (e.g., used to fill a hole in an image). For instance, high-confidence pixels can be predicted pixels that have a confidence value above a predefined threshold. These high-confidence pixels can be used as known pixels to replace undefined pixels in a region where information for those respective pixels is not known (e.g., a hole in an image). In particular, by treating these high-confidence pixels as known pixels, the undefined pixels where information for those respective pixels is not known can be replaced with the corresponding known pixels (e.g., high-confidence pixels). By adding these pixels to an image as known pixels, the number of undefined pixels in the image can be reduced (e.g., the hole in the image is reduced in an iteration).

To create such an image inpainting system, one or more neural networks can be used. For instance, the image inpainting system can implement one or more neural networks based on a generative adversarial network architecture (e.g., comprised of a generator and a discriminator). For instance, the generator can be comprised of a coarse result neural network (e.g., comprised of an encoder and a decoder) and a fine result neural network (e.g., comprised of an encoder and two decoder). The image inpainting system can use a coarse result neural network to generate a low-resolution image with the hole filled for an input incomplete image (e.g., image with a hole). The fine result neural network can then receive the low-resolution image (e.g., generated by the coarse neural network). A first decoder of the fine result neural network (e.g., an image decoder) can predict an inpainting image result (e.g., a higher resolution completed image), and the second decoder of the fine result neural network (e.g., a confidence decoder) can generate a corresponding confidence map of the predicted inpainting image result (e.g., from the image decoder). This corresponding confidence map can be used to determine high-confidence pixels that can be used to replace the undefined pixels in the one or more holes in the input image.

Any number of inpainting iterations can be performed to fill the hole in the input image. During each iteration, the image inpainting system can rely on a feedback mechanism based on the confidence analysis. Incorporating such a confidence analysis feedback mechanism can ensure that a final output image can be an inpainting image result that has the one or more regions of undefined pixels replaced with high-confidence pixels generated by the image inpainting system. In this way, the image inpainting system can more accurately fill holes in images.

BRIEF DESCRIPTION OF THE SEVERAL VIEWS OF THE DRAWING

These and other features, aspects, and advantages of the present disclosure are better understood when the following Detailed Description is read with reference to the accompanying drawings.

DETAILED DESCRIPTION OF THE INVENTION

Figure 1A:
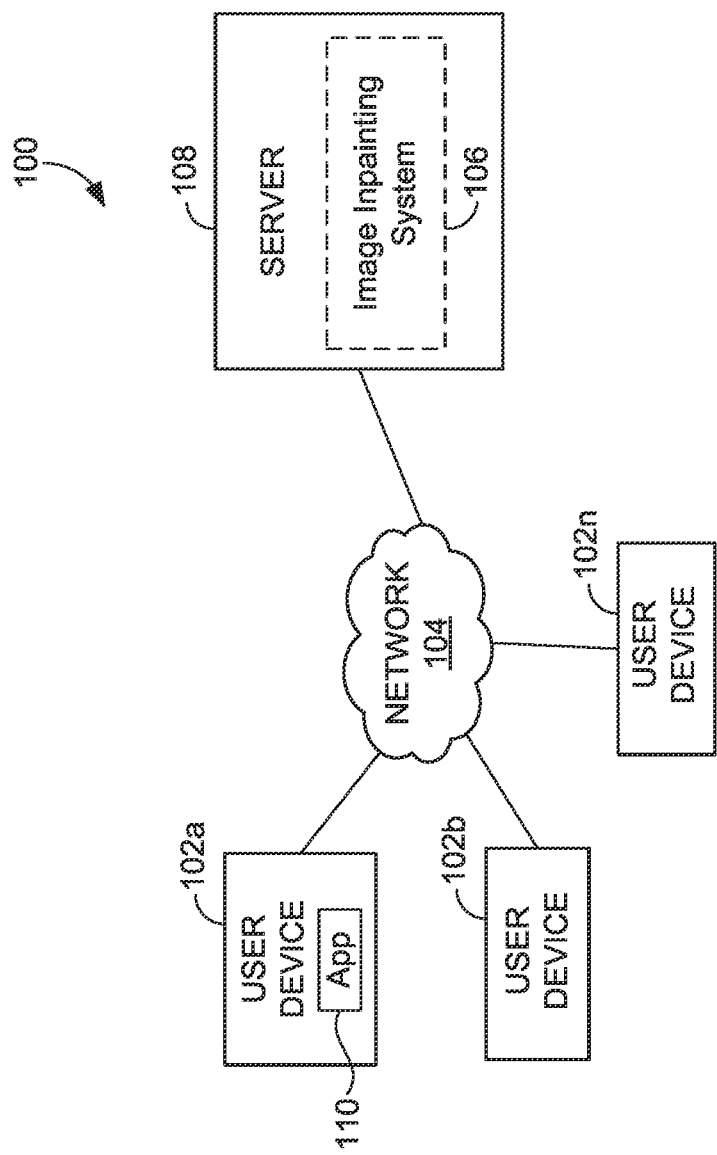
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In an imaging environment, such as an imaging or a photograph editing application (e.g., Adobe® Photoshop®), users often desire to fix images, or a region, or portion thereof. For example, a user might want to remove a person from an image or restore a degraded portion of an image. In conventional implementations, inpainting methods borrow example patches from known regions in an image and paste the known regions into unknown regions with undefined pixels where information for those respective pixels is not known (e.g., holes). While these conventional methods can be effective on filling small holes or regions with a uniform textured background, such methods often fail to produce realistic results when a hole is large.

With the advancement of technology, various methods for image inpainting have shifted to deep learning techniques (e.g., based on neural networks). Such deep learning techniques have shown promise in filling unknown regions with undefined pixels in complex images. However, even when using these deep learning based techniques for image inpainting, there has been difficulty in generating high quality images. Oftentimes, such deep learning techniques produce visual artifacts in images, especially when filling large unknown regions (e.g., large holes) in images.

Accordingly, embodiments of the present disclosure are directed to an image inpainting system (e.g., an iterative image inpainting system) that provides an iterative inpainting method with a feedback mechanism. In particular, the iterative image inpainting system not only performs iterative inpainting but also utilizes a confidence analysis during iterations of the inpainting result. In this regard, the confidence analysis can provide information that can be used as feedback to progressively fill one or more regions with undefined pixels in an image where information for those respective pixels is not known (e.g., holes) using information related to high-confidence pixels identified using image inpainting. Such one or more regions can correspond to a hole to fill using image inpainting. Such regions can relate to areas in an image for editing (e.g., remove stains, scratches, blurred regions, objects, etc.). A hole can be generated by removing pixels information for the pixels in the one or more regions. In this way, the hole can comprise undefined pixels where information for these respective pixels is not known. In this way, the undefined pixels in the one or more regions can be filled using pixel information determined during image inpainting.

In particular, the confidence analysis ensures that only high-confidence pixels are trusted in an iteration of inpainting. For instance, high-confidence pixels can be predicted pixels that have a confidence value above a predefined threshold (e.g., 0.5 confidence value threshold indicating a 50% confidence that a predicted pixel is correct). These high-confidence pixels can be used as known pixels to replace undefined pixels in a region where information for those respective pixels is not known (e.g., a hole). In particular, by treating these high-confidence pixels as known pixels, the undefined pixels where information for those respective pixels is not known can be replaced with the corresponding known pixels (e.g., high-confidence pixels). By adding these known pixels, the number of undefined pixels can be reduced (e.g., the hole in the image is reduced in an iteration).

Whereas, remaining predicted pixels that are low-confidence pixels (e.g., with a confidence value below the predefined threshold) can be reevaluated in a subsequent iteration of inpainting. As such, embodiments of the present disclosure use partial predictions of previous inpainting iterations (e.g., high-confidence pixels) as known pixels in subsequent inpainting iterations. Advantageously, using such a process improves the quality of a final result (e.g., output) of image inpainting. In this way, iterative image inpainting can more accurately fill holes, regions, and/or portions of images by relying on the confidence analysis feedback mechanism.

In more detail, embodiments of the present disclosure are directed to an iterative image inpainting system based on a deep generative model that not only outputs an inpainting result (e.g., image with a filled hole) but also generates a corresponding confidence map. In particular, and as described herein, the iterative image inpainting system can use a model trained to generate a confidence map that identifies pixels where the prediction error is likely small (e.g., high-confidence pixels). Advantageously, this can help the model overcome prediction ambiguity in iterations of inpainting. Using this confidence map as feedback, the model can be trained to progressively fill a hole by trusting high-confidence pixels inside the hole at each iteration and updating the remaining pixels in a subsequent iteration. By predicting what portion of the hole was successfully filled in a previous iteration and using these high-confidence pixels as known, the model can gradually improve the result when filling a large hole.

To perform iterative image inpainting that incorporates a confidence analysis, the image inpainting system can train and/or use machine learning models. In an embodiment, the image inpainting system can be implemented using one or more neural networks. A neural network generally refers to a computational approach using large clusters of connected neurons. For example, a neural network can be comprised of fully connected layers. Neural networks are self-learning and trained rather than explicitly programmed such that a generated output of a neural network reflects a desired result.

In embodiments, the image inpainting system can comprise one or more networks based on a generative adversarial architecture. For instance, the generator of the image inpainting system can be comprised of a coarse result neural network (e.g., comprised of an encoder and a discriminator) and a fine result neural network (e.g., an encoder and two discriminators). In some embodiments, such as during training of the image inpainting system, the image inpainting system can further comprise additional adversarial network as the discriminator. The image inpainting system can use a coarse result neural network to generate a coarse completed image (e.g., an image with the hole filled) for an input incomplete image (e.g., image with a hole). The coarse result neural network can further use a corresponding hole mask (e.g., a mask that designates the hole in the image) in generating the coarse completed image. This coarse completed image can have low pixel values (e.g., 64×64). The fine result neural network, for example, can receive the coarse completed image (e.g., generated by the coarse neural network). The first decoder of the fine result neural network (e.g., an image decoder) can predict an inpainting image result (e.g., a fine completed image), and the second decoder of the fine result neural network (e.g., a confidence decoder) can generate a corresponding confidence map of the predicted inpainting image result (e.g., from the image decoder). The predicted inpainting image result can have high pixel values (e.g., 256×256).

In more detail, the image inpainting system can use information related to a confidence map as a feedback mechanism during iterative image inpainting. In particular, the image inpainting system can be used to predict pixels (e.g., predict pixel information) for one or more regions in an image with undefined pixels where information for those respective pixels is not known (e.g., holes). For instance, pixels can be predicted using the coarse result neural network and the fine result neural network. Further, the fine result neural network can generate a corresponding confidence map of the predicted pixels. By analyzing confidence values of the confidence map for the predicted pixels, high-confidence pixels can be identified (e.g., pixels with a confidence value over a predefined threshold). These high-confidence pixels can be used to replace the undefined pixels in the image in a subsequent iteration of inpainting (e.g., treat the high-confidence pixels as known pixels). In this way, the confidence map can be used as a feedback mechanism such that high-confidence pixels are used to iteratively replace undefined pixels, thus filling one or more holes in the image.

The image inpainting system can be trained to perform iterative image inpainting using a confidence analysis as a feedback mechanism. In one embodiment, synthesized training samples with realistic holes can be used to train the one or more networks of the image inpainting system. For instance, objects masks (e.g., masks representing objects) can be obtained from one or more datasets. One or more of these object masks can then be placed on an image to create an image with a portion for filling (e.g., a hole with undefined pixels). In some embodiments, the object masks can be placed in random locations. In other embodiments, the object masks can be placed behind an object in an image. Such placement behind an object in the image mirrors a common workflow used in image editing (e.g., removing an undesired object from behind the main object in an image). This placement of object masks behind an object in an image can be performed automatically. In particular, a salient object can be identified in an image. After identifying the salient object in the image, an object mask can be placed behind and/or near the salient object. In some embodiments, any mix of training image types can be used to train the image inpainting system. For example, in addition to synthesized training samples with realistic holes comprising undefined pixels, training samples can be synthesized using a mix of random strokes. Advantageously, adding random strokes to the training dataset can create a more diverse training dataset that can overcome biases towards object shaped holes.

To train the image inpainting system, an image with undefined pixels can be received. In the image, one or more holes can be identified (e.g., one or more regions in the image with undefined pixels where information for those respective pixels is not known). The image inpainting system can then predict pixels (e.g., pixel information) for these holes. For instance, pixels can be predicted using one or more neural networks (e.g., the coarse result neural network and the fine result neural network). In particular, during a first iteration, the coarse result neural network can generate a coarse completed image by filling the one or more regions in the image with predicted pixels. This coarse completed image can have low-resolution pixel values (e.g., 64×64). Further, the fine result neural network can receive the coarse completed image (e.g., generated by the coarse neural network), and a first decoder of the fine result neural network (e.g., an image decoder) can predict an inpainting image result (e.g., a fine completed image). This inpainting image result can be the image with the one or more holes filled with predicted pixels. In addition, the inpainting image result can have high-resolution pixel values (e.g., 256×256).

An inpainting image result can be analyzed to determine any error in the image inpainting system. Such error can be determined using loss functions. For instance, loss between the inpainting image result and a ground-truth image can be used to update the image inpainting system (e.g., the coarse result neural network). For example, L1 reconstruction loss can be used. In addition, loss based on the inpainting image result can be used to update the image inpainting system (e.g., the fine result neural network). For instance, L1 reconstruction loss and hinge adversarial loss with spectral normalization can be used.

In addition to the generation of an image with the one or more holes filled with predicted pixels, the image inpainting system can generate a confidence map that corresponds to the predicted pixels. A confidence map can indicate a confidence value for the pixels in the image. For instance, a pixel that is not an undefined pixel (e.g., not within the hole) can have a confidence value of 1.0 (e.g., a 100% confidence value that the pixel is correct). Pixels that are undefined pixels where information is not known (e.g., within the hole) can have a confidence value between 0 and 1.0 where 0 is low confidence that the predicted pixel is correct and 1.0 is high confidence that the predicted pixel is correct. During training, the confidence map can be binarized. In particular, the confidence map can be set such that predicted pixels with a pixel value over a predefined threshold (e.g., 0.5) are set as high-confidence "known" pixels, and predicted pixels with a pixel value under the predefined threshold (e.g., 0.5) are set as low-confidence pixels that remain as undefined pixels where information is not known. The high confidence "known" pixels can be used to replace corresponding undefined pixels from the initial input image such that in a subsequent iteration of image inpainting the input image can be the initial input image with undefined pixels replaced with high-confidence "known" pixels as determined in the first iteration.

To train the image inpainting system to incorporate a feedback mechanism based on a confidence analysis based on the confidence map, a composite image can be generated. In particular, the composite image can be generated by compositing predicted pixels designated as low-confidence pixels with a ground-truth image. In one embodiment, predicted pixels designated as low-confidence pixels can be predicted pixels that have a confidence value under 0.5. In particular, a reverse confidence map can be generated and used to designate these low-confidence pixels. In this way, low-confidence pixels from the predicted pixels can be composited with a corresponding ground-truth image (e.g., corresponding to the initial image with one or more holes input into the image inpainting system). This composite image can then be analyzed to determine any error in the image inpainting system. For example, loss based on the composite image can be used to update the image inpainting system (e.g., the fine result neural network). For instance, L1 reconstruction loss and hinge adversarial loss with spectral normalization can be used.

In some embodiments, the image inpainting system can undergo two iterations of iterative image inpainting during training. For instance, an initial iteration can be performed on an input image (e.g., with one or more holes) to generate an initial coarse completed image and then an initial inpainting image result along with an initial corresponding confidence map. The image inpainting system can then be analyzed for errors (e.g. using loss). Then, a subsequent iteration can be performed on the input image (e.g., with one or more holes filled using high-confidence pixels from the initial iteration) to generate a subsequent coarse completed image and then a subsequent inpainting image result along with a subsequent corresponding confidence map. The image inpainting system can then be analyzed for errors (e.g. using loss).

The overall process of training the image inpainting system can be repeated for a sufficiently large number of cycles. For instance, training can continue until one or more adversarial network(s) can no longer differentiate between a generated inpainted image or a ground-truth image as real or fake. In some embodiments, training can continue until the error stops decreasing from iteration to iteration. In further embodiments, a predefined number of training iterations can be used to train the image inpainting system (e.g., 5000 iterations) before the system is validated for performance. Such a predefined number of training iterations can balance the tradeoff between time and computational resources using during training and the accuracy of the functioning network(s) of the system. In some embodiments, the coarse result neural network can be trained individually for a number of training iterations prior to the fine result neural network being added to the image inpainting system and trained as discussed herein.

Upon completion of training, the trained image inpainting system can be used to perform iterative inpainting method using a feedback mechanism based on a confidence analysis of predicted pixels. In this way, a user can input an image with one or more regions with undefined pixels where information for those respective pixels is not known. The trained image inpainting system can perform any number of iterations relying on the feedback mechanism based on the confidence analysis such that a final output image can be an inpainting image result that has the one or more regions of undefined pixels replaced with high-confidence pixels generated by the trained image inpainting system.

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image editing, such as, iterative image inpainting. In some implementations, the application(s) comprises a web application, which can run in a web browser, and could be hosted at least partially on the server-side of environment 100. In addition, or instead, the application(s) can comprise a dedicated application, such as an application having image editing and/or processing functionality. For example, such an application can be configured to display images and/or allow the user to input or identify images for editing. In some cases, the application is integrated into the operating system (e.g., as a service). It is therefore contemplated herein that "application" be interpreted broadly. Example applications include Adobe® Photoshop®, LightRoom®, and the like.

In accordance with embodiments herein, application 110 can facilitate iterative image inpainting that utilizes a confidence analysis during iterations of inpainting. In particular, a user can select or input an image or picture for editing (e.g., remove stains, scratches, blurred regions, objects, etc.). An image and/or picture can be selected or input in any manner. The application may facilitate the access of one or more images stored on the user device 102a (e.g., in a photo library), and/or import images from remote devices 102b-102n and/or applications, such as from server 108. For example, a user may take a picture using a camera on a device, for example, user device 102a. As another example, a user may select a desired image from a repository, for example, stored in a data store accessible by a network or stored locally at the user device 102a. Based on the input image, the input image can undergo iterative image inpainting using techniques, some of which are further discussed below with reference to image inpainting system 204 of FIG. 2, and an edited image can be provided to the user via the user device 102a.

In particular, a user can indicate a region or portion of an image for editing (e.g., iterative inpainting) using application 110. Such an indication can be based on a user action with the image (e.g., click, scribble, object selection, etc.). Based on the user indication, a hole (e.g., based on the indicated region or portion of the image) in the image can undergo iterative image inpainting. Such iterative image inpainting can be performed until the hole is filled with high-confidence pixels (e.g., based on confidence analysis during iterations of the inpainting). Once the hole is filled with the high-confidence pixels, an edited image (e.g., containing the filled hole) can be provided to a user (e.g., via user device 102a).

The user device can communicate over a network 104 with a server 108 (e.g., a Software as a Service (SAAS) server), which provides a cloud-based and/or network-based image inpainting system 106. The image inpainting system may communicate with the user devices and corresponding user interface to facilitate providing an edited image (e.g., using iterative image inpainting) to a user via the user device using, for example, application 110.

As described herein, server 108 can facilitate iterative image inpainting that utilizes a confidence analysis during iterations of inpainting via image inpainting system 106. Server 108 includes one or more processors, and one or more computer-readable media. The computer-readable media includes computer-readable instructions executable by the one or more processors. The instructions may optionally implement one or more components of image inpainting system 106, described in additional detail below. Server 108 is capable of editing images using iterative image inpainting. Such iterative image inpainting can include a confidence analysis during the iterations of inpainting. This confidence analysis can provide information that can be used as a feedback mechanism to progressively fill a hole in an image with high-confidence pixels. For instance, partial predictions of a previous inpainting iterations (e.g., high-confidence pixels) can be used as known pixels in a subsequent inpainting iteration.

For cloud-based implementations, the instructions on server 108 may implement one or more components of image inpainting system 106. Application 110 may be utilized by a user to interface with the functionality implemented on server(s) 108, such as image inpainting system 106. In some cases, application 110 comprises a web browser. In other cases, server 108 may not be required, as further discussed with reference to FIG. 1B.

Thus, it should be appreciated that image inpainting system 106 may be provided via multiple devices arranged in a distributed environment that collectively provide the functionality described herein. Additionally, other components not shown may also be included within the distributed environment. In addition, or instead, image inpainting system 106 can be integrated, at least partially, into a user device, such as user device 102a.

Figure 1B:
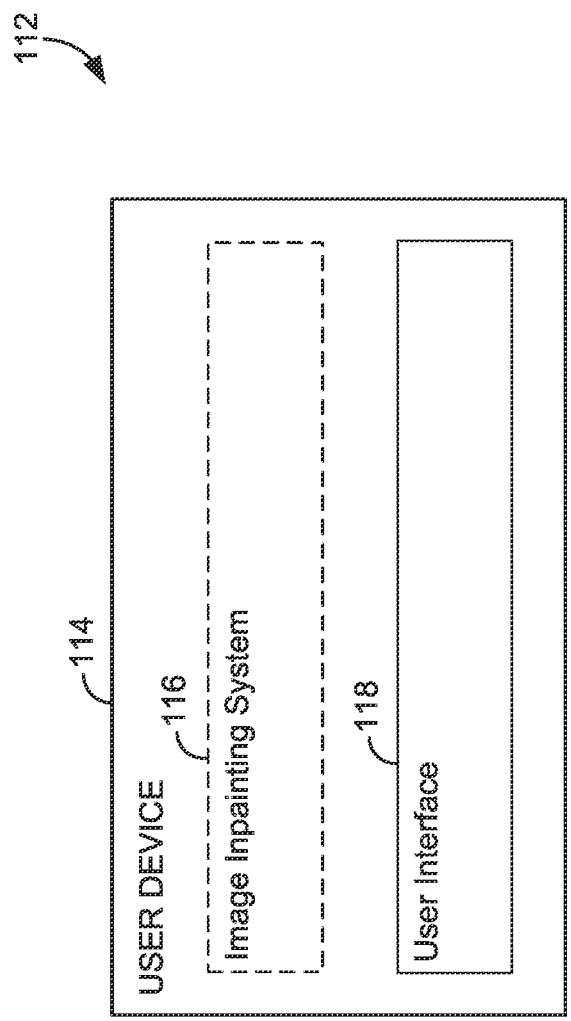
FIG. 1B depicts another example configuration of an operating environment in which some implementations of the present disclosure can be employed, in accordance with various embodiments.

Referring to FIG. 1B, aspects of an illustrative image inpainting system are shown, in accordance with various embodiments of the present disclosure. FIG. 1B depicts a user device 114, in accordance with an example embodiment, configured to allow for iterative image inpainting that utilizes a confidence analysis during iterations of the inpainting result. The user device 114 may be the same or similar to the user device 102a-102n and may be configured to support the image inpainting system 116 (as a standalone or networked device). For example, the user device 114 may store and execute software/instructions to facilitate interactions between a user and the image inpainting system 116 via the user interface 118 of the user device.

A user device can be utilized by a user to edit an image using iterative image inpainting incorporating a confidence analysis during iterations. In particular, a user can select or input an image or picture for editing utilizing user interface 118. An image and/or picture can be selected or input in any manner. The user interface may facilitate the user accessing one or more images stored on the user device (e.g., in a photo library), and/or import images from remote devices and/or applications. Based on the input image, a portion or region of the input image can be selected for editing using iterative inpainting. This iterative inpainting can be performed using various techniques, some of which are further discussed below with reference to image inpainting system 204 of FIG. 2, and an edited image can be provided to the user via a user interface.

Figure 2:
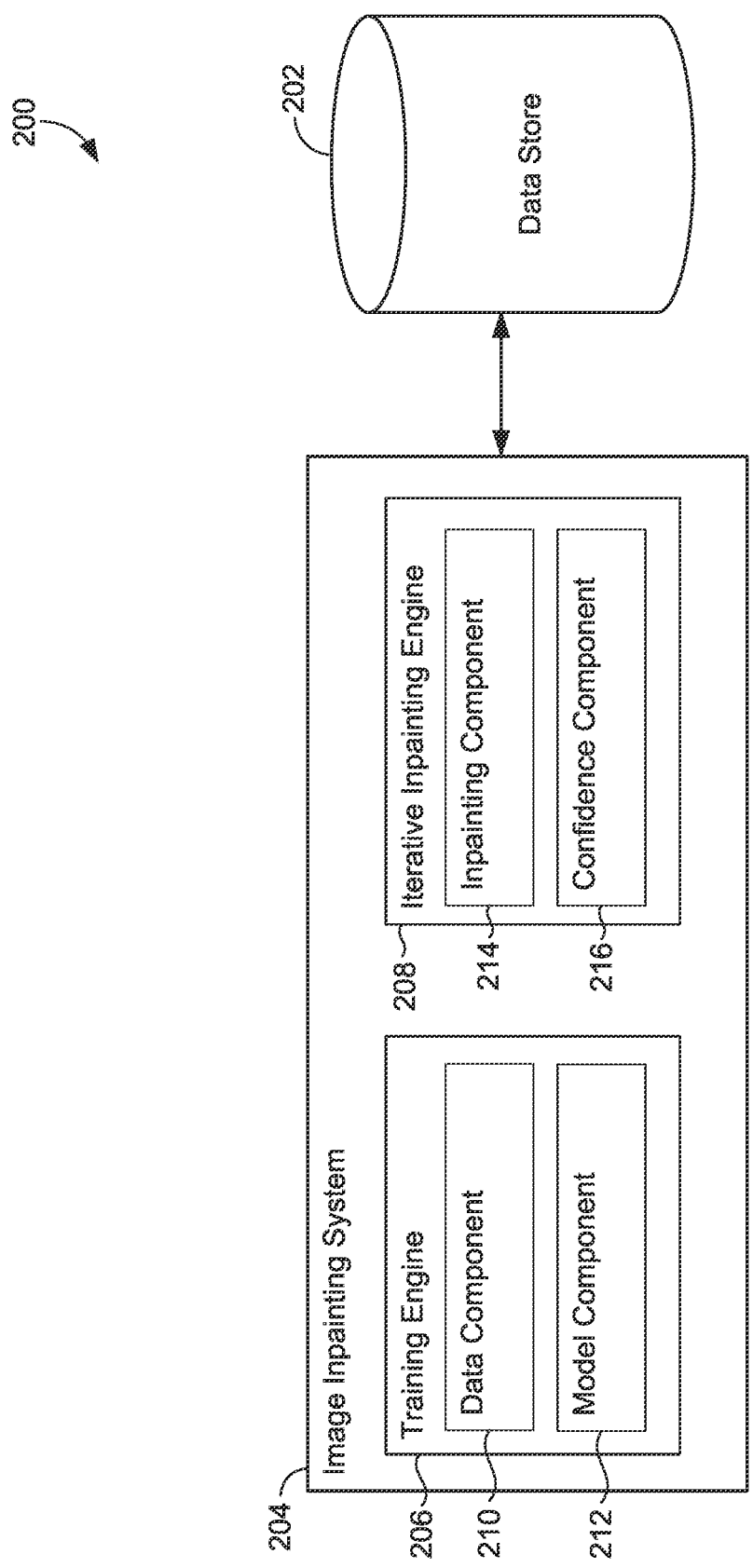
FIG. 2 depicts a further example configuration of an operating environment in which some implementations of the present disclosure can be employed, in accordance with various embodiments of the present disclosure.

Referring to FIG. 2, aspects of an illustrative image editing environment 200 are shown, in accordance with various embodiments of the present disclosure. Image inpainting system 204 includes training engine 206 and iterative inpainting engine 208. The foregoing engines of image inpainting system 204 can be implemented, for example, in operating environment 100 of FIG. 1A and/or operating environment 112 of FIG. 1B. In particular, those engines may be integrated into any suitable combination of user devices 102a and 102b through 102n and server(s) 108 and/or user device 114. While training engine and iterative inpainting engine are depicted as separate engines, it should be appreciated that a single engine could perform the functionality of one or more of the engines. Additionally, in implementations, the functionality of the engines can be performed using additional engines.

Such an image inpainting system can work in conjunction with data store 202. Data store 202 can store computer instructions (e.g., software program instructions, routines, or services), data, and/or models used in embodiments described herein. In some implementations, data store 202 can store information or data received via the various engines and/or components of image inpainting system 204 and provides the various engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data store 202 can be used to store a neural network system capable of being used to edit an image using iterative image inpainting. This iterative image inpainting can incorporate a confidence analysis during iterations of the inpainting such that only high-confidence pixels are used to edit the image in an iteration. In particular, iterative image inpainting can continue until a region and/or portion (e.g., hole) of the image is filled with high-confidence pixels. Such iterative image inpainting can be based on deep learning techniques, further discussed below with reference to training engine 206 and iterative inpainting engine 208. Such a neural network system can be comprised of one or more neural networks.

In embodiments, data stored in data store 202 can include images a user can select for editing using, for example, the image inpainting system. An image can include a visual representation of a person, object, or scene. Examples of an image can include digital versions of a picture, painting, drawing, and/or photograph. Such images can be input into data store 202 from a remote device, such as from a server or a user device (e.g., MIT's Places2 dataset and a salient object segmentation dataset). Data stored in data store 202 can also include training data. Such training data can comprise synthesized training samples with realistic holes and/or synthesized training samples using a mix of random strokes. The generation of such synthesized training samples is further discussed with reference to data component 210 of FIG. 2 and FIGS. 4-5.

Image inpainting system 204 can generally be used for editing images using iterative image inpainting. Specifically, the image inpainting system can be configured for iterative image inpainting that utilizes a confidence analysis during iterations of the inpainting process. As used herein, iterative image inpainting is the process of progressively filling a hole in an image. In particular, the image inpainting system can train and/or use machine learning models to perform iterative image inpainting that incorporates a confidence analysis. This confidence analysis can provide information that can be used as a feedback mechanism to ensure that high-confidence pixels are used when filling the hole in the image.

In accordance with embodiments described herein, the image inpainting system can be run using, for example, one or more networks based on a generative adversarial architecture. For example, the generator of the image inpainting system can be comprised of a coarse result neural network (e.g., an encoder and a discriminator) and a fine result neural network (e.g., an encoder and two discriminators). The coarse result neural network, for example, can receive an incomplete image (e.g., image with a hole) along with a corresponding hole mask (e.g., a mask that designates the hole in the image) and generates a coarse completed image (e.g., an image with the hole filled). This coarse completed image can have low pixel values (e.g., 64×64). The fine result neural network, for example, can receive the coarse completed image (e.g., generated by the coarse neural network). The first decoder of the fine result neural network (e.g., an image decoder) can predict an inpainting image result (e.g., a fine completed image) and the second decoder of the fine result neural network (e.g., a confidence decoder) can generate a corresponding confidence map of the predicted inpainting image result (e.g., from the image decoder). The predicted inpainting image result can have high pixel values (e.g., 256×256).

In some embodiments, such as during training, the image inpainting system can further comprise an additional adversarial network related to adversarial training as the discriminator (e.g., a discriminator with spectral normalization). For instance, the adversarial network can receive the inpainted image or a ground-truth image and output a classification for each patch of the input image as real or fake. Such a classification can be a score map where each element corresponds to a local region of the input image covered by its receptive field.

Training engine 206 can be used to train aspects of the image inpainting system. For instance, training engine 206 can be used to generate data for use in training the image inpainting system. For instance, the data can comprise synthesized training samples with realistic holes and/or synthesized training samples using a mix of random strokes. In addition, training engine 206 can be used to train the one or more networks of the image inpainting system. For instance, the image inpainting system can be comprised of a coarse result neural network (e.g., a GAN comprised of a generator and a discriminator) and a fine result neural network (e.g., a GAN comprised of a generator and two discriminators). During training, the image inpainting system can further comprise at least one adversarial network.

As shown, training engine 206 can include data component 210 and model component 212. The foregoing components of training engine 206 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. It should be appreciated that while the data component and the model component are depicted as different components, in implementations, the functionality of the components can be performed using a single component and/or one or more additional components.

Generally, data component 210 can be configured to generate data for use in training the image inpainting system. In embodiments, such data can comprise synthesized training samples with realistic holes and/or synthesized training samples using a mix of random strokes. In particular, the data component can be used to synthesize training samples with realistic holes. For example, objects masks can be obtained from one or more datasets. Such datasets can include densely annotated segmentation datasets, including, for example, video segmentation, semantic segmentation, salient object segmentation, and/or human parsing. The object masks obtained from such datasets can be from various subject matter areas and have different shapes and sizes. In particular, salient object segmentation datasets often contain large objects (e.g. people, animals, cars, etc.) that can be used to generate training samples with large holes. Further, human parsing datasets can be used to generate human-shaped masks. Advantageously, such datasets can be used to train the image inpainting system to remove regions of images that contain distracting people or objects in images.

Further, the data component can be used to synthesize training samples using a mix of random strokes. Such synthesized training samples can be used for training, alone, or in addition to the object masks as holes. Adding random strokes to the training dataset can create a more diverse training dataset that can overcome biases in image inpainting system towards object shaped holes.

Images that can be used in synthesizing training samples can be obtained from various sources (e.g. Places2 dataset and a salient object segmentation dataset). As a non-limiting example, images with pixel-level annotations of salient objects can be used (e.g., information about content of an object). From these images, a first portion can be used as testing samples and a second portion can be used, along with additional images (e.g., from Places2 dataset) can be used during training and validation of the image inpainting system. For instance, for the additional images (e.g., from Places2 dataset), location of the holes can be randomly sampled. In particular, by randomly sampling the location of holes in the images, the holes can appear in any region in the images and/or may overlap with one or more main objects in an image. For images taken from a salient object segmentation dataset, the holes can be generated such that they are located in the intersection area with the salient object in the image. Such placement of hole can simulate the removal of a distracting region that is occluded by a salient object in an image.

To access an image to generate a training sample, the image can be accessed or referenced by data component 210. In this regard, the data component 210 may access or retrieve an image via data store 202 and/or from a remote device, such as from a server or a user device. As another example, the data component 210 may receive an image provided to the image inpainting system 204 via a user device. In some embodiments, data component 210 can be used to obtain previously generated training samples. Such training samples can be generated, for instance, using the discussed training data generation techniques.

Upon obtaining training data (e.g., using data component 210), model component 212 can be utilized train one or more machine learning models to perform iterative image inpainting that incorporates a confidence analysis. For instance, a hole in an image can be optimally filled using iterations of inpainting based on the confidence analysis. As an example, as a hole in an image is filled in an iteration of inpainting, the pixels that have been used to fill the hole will be analyzed for accuracy. During a subsequent iteration of inpainting, only highly confident pixels will be maintained. In this way, the confidence analysis can provide information that can be used as a feedback mechanism to ensure that high-confidence pixels are used when filling the hole in the image.

In embodiments, the model component 212 can be used to train one or more neural networks based on a generative adversarial architecture. For instance, the model component 212 can train a generator comprised of a coarse result neural network and a fine result neural network along with an adversarial neural network as a discriminator. The coarse result neural network can be comprised of an encoder and a decoder. The fine result neural network can be comprised of an encoder and two decoders. The adversarial neural network can be comprised of a discriminator with spectral normalization. Training can be implemented using, for example, Python and Pytorch. In addition, an Adam optimizer can be used during training. Further, a learning rate can be set to 0.0001 and a batch size set to 64. To prevent the model from ignoring scarce samples, an equal number of samples can be sampled from any datasets used (e.g., Places2 dataset and a saliency dataset) for each batch Initially, to train the one or more neural networks of the image inpainting system, the coarse result neural network can receive a training image (e.g., an image with a hole) along with a corresponding mask of the hole in the image. From this training image and corresponding mask, the coarse result neural network can generate a coarse completed image. This coarse completed image can be a low-resolution image with the hole filled. In some embodiments, this coarse result neural network can undergo iterations of training prior to the other portions of the image inpainting system undergoing training. During training, the coarse result neural network can be updated for errors.

Adjusting the coarse result neural network to correct for errors can be accomplished by changing at least one node parameter. The coarse result neural network can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Errors can be determined, for example, using loss functions. For instance, loss between the coarse completed image and a ground-truth image can be used to update the coarse result neural network. For instance, L1 reconstruction loss can be used.

To further train the one or more neural networks of the image inpainting system, the fine result neural network can receive a coarse completed image (e.g., generated by the coarse neural network). From this coarse completed image, the fine result neural network can predict an inpainting image result. The inpainting image result can be a fine completed image (e.g., a high-resolution image with the hole filled). In addition, the fine result neural network can generate a corresponding confidence map of the inpainting image result. While training the image inpainting system, in one embodiment, a fixed threshold can be used to determine whether predicted pixels should be used to fill the hole (e.g., pixels with a value of 0.5 value and above can become known). In other embodiments, pixels can become known and used to fill the hole when a confidence score is higher than a confidence score from the previous iteration. During training, the fine result neural network can be updated for errors.

Adjusting the fine result neural network to correct for errors can be accomplished by changing at least one node parameter. The fine result neural network can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

For instance, loss can be used to update the fine result neural network. For example, L1 reconstruction loss and hinge adversarial loss with spectral normalization can be used (e.g., applied to the discriminator(s) of fine result neural network). In more detail, such loss can be represented for discriminator D as:

$$\mathcal{L}_D = \mathbb{E}_{x \sim P_{data}(x)}[\text{ReLU}(\mathbb{1} - D(x))] + \mathbb{E}_{z \sim P_z(z)}[\text{ReLU}(\mathbb{1} - D(G(z) \cdot m + z))]$$

In such an equation, x can denote a real (e.g., ground-truth) image and z can represent an incomplete image (e.g., image with a hole). In such an incomplete image, the pixels inside the hole can have a value set to zero. In addition, m can represent the hole mask. Such a hole mask can have pixels with a value set to one representing the hole. G(•) can represent the image decoder. The inpainting result G(z)·m+z can be composed by the generated content G(z) inside the hole and the original content z outside the hole.

Further y can denote an output of the image decoder (e.g., y=G(z)), then the loss for the inpainting result can be represented as:

$$\mathcal{L}_{G(y)} = -\mathbb{E}_{z, x \sim P_{(z,x)}}[D(y \cdot m + z) + \|y - z\|_1]$$

In some embodiments, an assumption can be applied that high-confidence regions of an painting result have small losses. In this way, the confidence decoder can be used to detect high-confidence regions using an output confidence map as spatial attention on the predicted image when determining loss. For instance, c can be used to denote the confidence map (e.g., the output of the confidence decoder of which each element can be constrained to [0,1] by a sigmoid function). As an example, loss for the confidence decoder can be represented as:

$$\mathcal{L}_C = \mathcal{L}_G(y \cdot c + x \cdot (1-c)) + \lambda \cdot (\|c - m\|_1 + \|c - m\|_2)$$

The first term in such an equation can be used to encourage the confidence map to have high response on regions in which the loss $\mathcal{L}_G$ is small. The second term, on the other hand, can be used to penalize a trivial solution of all-zero confidence maps and encourages the high-confidence pixels to cover as much of the missing region (e.g., hole) as possible. Is some embodiments, the weight A of the second term can be set to a value of 0.1.

In some embodiments, the image inpainting system can undergo two iterations of iterative image inpainting during training. For instance, an initial iteration can be performed on an input image (e.g., with one or more holes) to generate an initial coarse completed image and then an initial inpainting image result along with an initial corresponding confidence map. The image inpainting system can then be analyzed for errors (e.g. using loss). Then, a subsequent iteration can be performed on the input image (e.g., with one or more holes filled using high-confidence pixels from the initial iteration) to generate a subsequent coarse completed image and then a subsequent inpainting image result along with a subsequent corresponding confidence map. The image inpainting system can then be analyzed for errors (e.g. using loss). Using two iterations can save computational resources and safe GPU memory for large batches.

Further, the image inpainting system can undergo validation. In particular, a number of image can be randomly taken from the training split of the Places2 dataset and a saliency dataset for use as validation samples. The model can be trained until a peak signal-to-noise on the validation set does not increase. During validation testing, the number of iterations for iterative inpainting can be set to four.

Iterative inpainting engine 208 can be used to implement one or more trained neural networks as part of the image inpainting system. For instance, iterative inpainting engine 208 can implement the image inpainting system using the trained generator comprised of the coarse result neural network (e.g., encoder and decoder) and the fine result neural network (e.g., encoder and two decoders). The coarse result neural network, for example, can receive an incomplete image (e.g., image with a hole) along with a corresponding hole mask (e.g., a mask that designates the hole in the image) and generates a coarse completed image (e.g., an image with the hole filled). The fine result neural network, for example, can receive the coarse completed image (e.g., generated by the coarse neural network). The first decoder of the fine result neural network (e.g., an image decoder) can predict an inpainting image result (e.g., a fine completed image), and the second decoder of the fine result neural network (e.g., a confidence decoder) can generate a corresponding confidence map of the predicted inpainting image result (e.g., from the image decoder).

As shown, the iterative inpainting engine 208 can include inpainting component 214 and confidence component 216. The foregoing components of iterative inpainting engine 208 can be implemented, for example, in operating environment 100 of FIG. 1A and/or operating environment 112 of FIG. 1B. In particular, those components may be integrated into any suitable combination of user devices 102*a* and 102*b* through 102*n* and server(s) 106 and/or user device 114. It should be appreciated that while the inpainting component and the confidence component are depicted as separate components, in implementations, the functionality of the engine can be performed using a single component and/or additional components.

Generally, inpainting component 214 can be configured to perform inpainting (e.g., fill a hole in an image). In particular, image analysis component 214 can be used to perform iterative image inpainting that utilizes a confidence analysis during the iterations of inpainting. In an embodiment, such an analysis can be performed using, for example, one or more neural networks. For example, the trained coarse result neural network and the trained fine result neural network.

Inpainting component 214 can be used to perform image inpainting. For example, in a first iteration, a completed image can be generated by filling the whole missing region (e.g., hole) with generated pixels. Generally, confidence component 216 can be used to analyze the pixels generated to fill missing regions in an image. In particular, confidence component 216 can be used to analyze pixels generated by inpainting component 214 to fill missing regions in an image. Pixels with a confidence value above 0.5 can be used to fill the missing region in a subsequent iteration (e.g., set as "known" pixels). Pixels with a confidence value below 0.5 can be set as missing regions in a subsequent iteration. Any number of iterations can be performed such that the mission region(s) (e.g., hole) is filled with high-confidence pixels (e.g., pixels with a confidence values above a predefined threshold).

Figure 3:
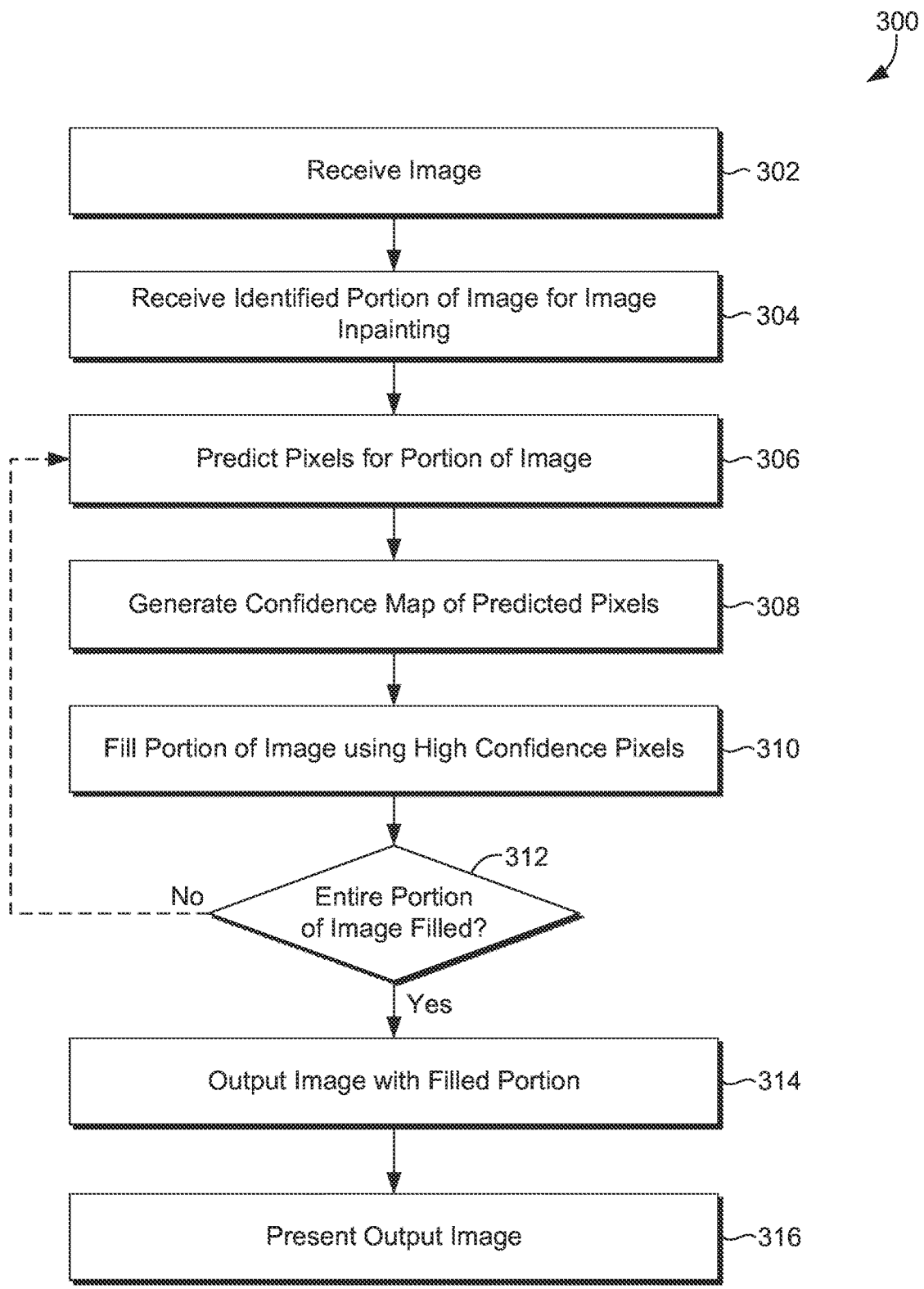
FIG. 3 depicts a process flow showing an embodiment of a method for performing iterative image inpainting, in accordance with embodiments of the present disclosure.

With reference to FIG. 3, a process flow is provided showing an embodiment of method 300 for performing iterative image inpainting, in accordance with embodiments of the present disclosure. Method 300 can be performed, for example by image inpainting system 204, as illustrated in FIG. 2.

At block 302, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

At block 304, an identified portion of the image for image inpainting is received. The identified portion of the image can be one or more regions in the image comprising undefined pixels where information for those respective pixels is not known (e.g., holes). In some embodiments, these one or more regions can be identified by a user. For instance, a user can indicate a region or portion of an image for editing (e.g., iterative inpainting). Such an indication can be based on a user action with the image (e.g., click, scribble, object selection, etc.). In other embodiments, the one or more regions can be identified using a corresponding hole mask (e.g., automatically added to an image).

At block 306, pixels are predicted for the image. In particular, pixels can be predicted for the identified portion of the image (e.g., received at block 304). Pixels can be predicted using one or more trained neural networks. For instance, pixels can be predicted using a generator comprising a trained coarse result neural network (e.g., an encoder and a decoder) and a trained fine result neural network (e.g., an encoder and two decoders). Such a coarse result neural network can receive an incomplete image (e.g., image with a hole) along with a corresponding hole mask (e.g., a mask that designates the hole in the image) and generates a coarse completed image (e.g., an image with the hole filled). Further, such a fine result neural network can receive the coarse completed image (e.g., generated by the coarse neural network), and a first decoder of the fine result neural network (e.g., an image decoder) can predict an inpainting image result (e.g., a fine completed image).

At block 308, a confidence map of the predicted pixels is generated. A confidence map can indicate a confidence value for the pixels in the image. For instance, a pixel that was not in the identified portion (e.g., the hole) of the image can have a confidence value of 1.0 (e.g., a 100% confidence value that the pixel is correct). Pixels in the identified portion (e.g., the hole) of the image can have a confidence value between 0 and 1.0 where 0 is a low confidence that the predicted pixel is correct and 1.0 is a high confidence that the predicted pixel is correct. Such confidence values can be based on the training of a second decoder of the fine result neural network (e.g., a confidence decoder) that can be used to generate a corresponding confidence map of the predicted inpainting image result (e.g., from the image decoder).

At block 310, the identified portion of the image is filled using high-confidence pixels. High-confidence pixels can be designated as pixels with a confidence value above a predefined threshold. For example, in some embodiments, high-confidence pixels can be pixels with a confidence value above over 0.5. As another example, in other embodiments, high-confidence pixels can be pixels that have a confidence value higher than the confidence value of a pixel in the previous iteration.

At block 312, a determination is made as to whether the entire portion (e.g., hole) of the image is filled. For instance, hole(s) are filled with high-confidence pixels. In particular, after filling the portion of the image using the high-confidence pixels, the remaining unfilled portion(s) of the image can be designated as new holes during a subsequent iteration. When the entire portion of the image is not filled (e.g., one or more holes in the image remain unfilled), the process can repeat iterations of blocks 306-310. Such iterations can continue until the entire portion of the image has been filled with high-confidence pixels. When a determination is made that the entire portion (e.g., hole) of the image is filled, the process proceeds to block 314.

At block 314, the image with a filled portion is output. This image is a compilation of the original image and the high-confidence pixels determined over iterations until all the pixels in the portion of the image (e.g., hole(s)) are filled. At block 316, the output image can be presented. Presentation of the output image allows a user to see and visualize the image that has undergone iterative image inpainting.

Figure 4:
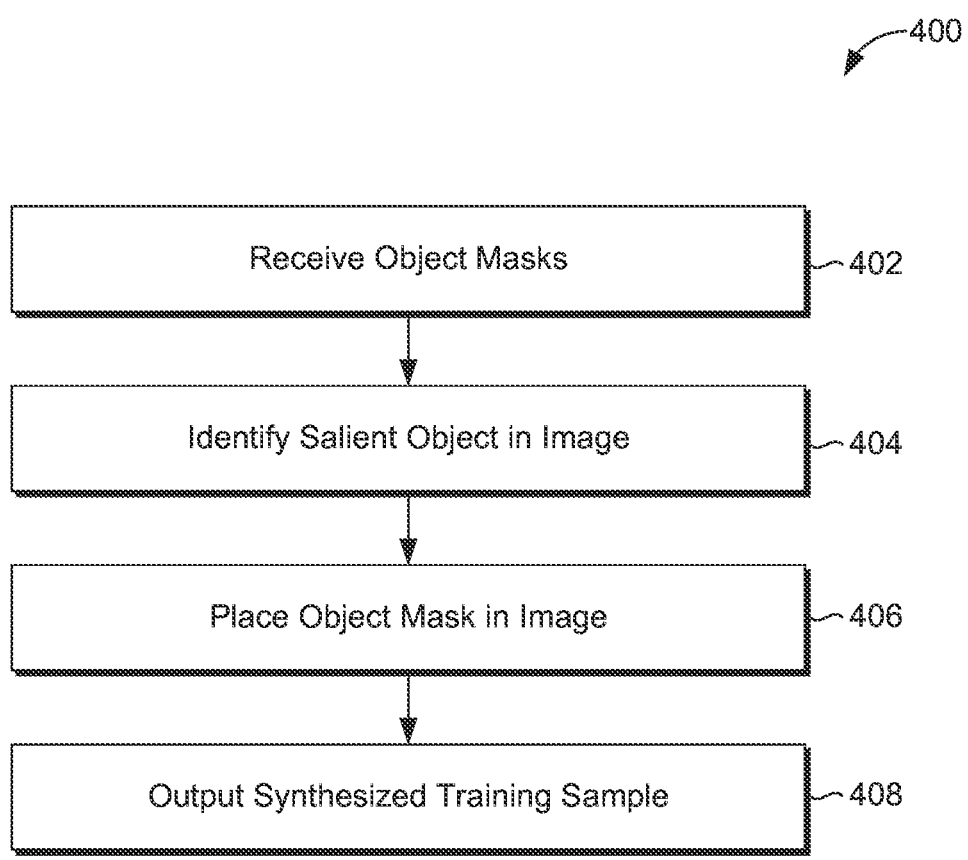
FIG. 4 depicts a process flow showing an embodiment of a method for generating training images for use in training an image inpainting system, in accordance with embodiments of the present disclosure.

With reference to FIG. 4, a process flow is provided showing an embodiment of method 400 generating training images for training an image inpainting system, in accordance with embodiments of the present disclosure. Method 400 can be performed, for example by image inpainting system 204, as illustrated in FIG. 2.

At block 402, object masks are received. Such object masks can be received from can be obtained from one or more datasets, such as a dataset stored in data store 202 of FIG. 2. Such datasets can include Places2 dataset and a salient object segmentation dataset. As a non-limiting example, images with pixel-level annotations of salient objects can be used. From these images, a first portion can be used as testing samples and a second portion can be used, along with additional images (e.g., from Places2 dataset), during training and validation of the image inpainting system. For instance, for the additional images (e.g., from Places2 dataset), location of the holes can be randomly sampled. In particular, by randomly sampling the location of holes in the images, the holes can appear in any region in the images and/or may overlap with one or more main object in an image. For images taken from a salient object segmentation dataset, the holes can be generated such that they are located in the intersection area with the salient object in the image. Such placement of hole can simulate the removal of a distracting region that is occluded by a salient object in an image.

At block 404, a salient object is identified in an image. A salient object can be identified using any number of techniques. For instance, a salient object can be identified using information associated with an image (e.g., received from a dataset). In embodiments, an image can be analyzed to identify a salient image.

At block 406, an object mask is placed in the image. In some instances, location of the object mask can be randomly sampled. In other instances, the location of the object mask can be in the intersection area with the salient object in the image. For example, the object mask can be placed behind and/or near the salient object. In other embodiments, the object mask can be a mix of random strokes rather than a mask associated with an object.

At block 408, a synthesized training sample is output. This synthesized training sample can have realistic holes (e.g., from the placed object mask) comprising undefined pixels. In addition, this synthesized training sample can have holes that are a mix of random strokes. Such a synthesized training sample can be used in training an image inpainting system as described herein.

Figure 5:
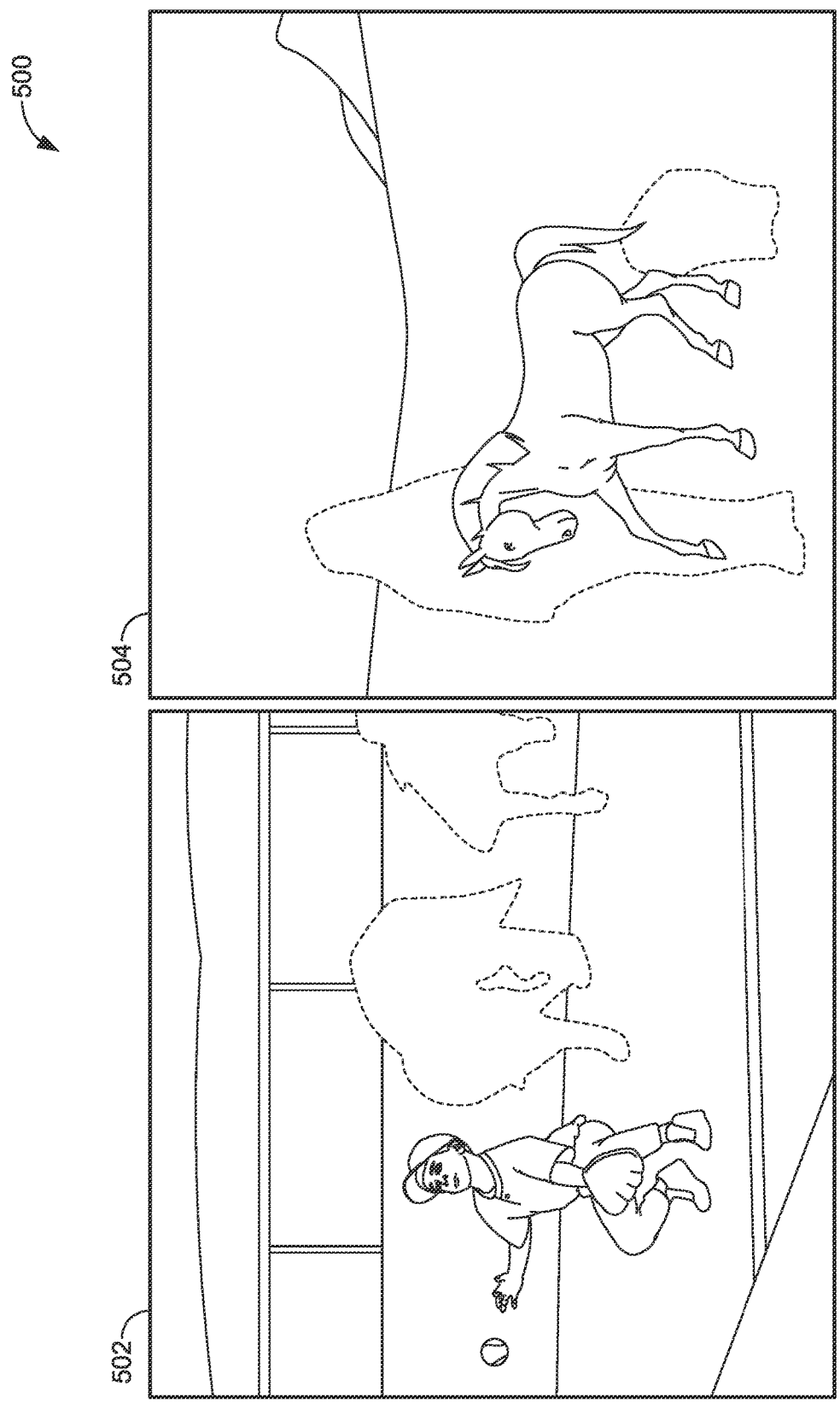
FIG. 5 depicts example training images that can be used in training an image inpainting system, in accordance with embodiments of the present disclosure.

With reference to FIG. 5, example training images 500 are displayed that can be used in training an image inpainting system, in accordance with embodiments of the present disclosure. Example training images 500 can be generated, for example by image inpainting system 204, as illustrated in FIG. 2.

Such example training images can be synthesized training samples with realistic holes. To generate such example training images, objects masks can be obtained from one or more datasets. One or more of these object mask can then be placed on an image to create an image with a portion for filling (e.g., a hole). In some embodiments, the object masks can be placed in random locations. For example, in image 502, two object masks have been placed in random locations. In other embodiments, the object masks can be placed behind an object in the image. Such placement behind an object mirrors a common workflow used in image editing. This placement of object masks behind an object in an image can be performed automatically. In particular, a salient object can be identified in an image. After identifying the salient object in the image, an object mask can be placed behind and/or near the salient object. For example in image 504, an object mask (e.g., of a person) has been placed behind an object (e.g., horse) in addition to the placement of another object mask near the object.

In embodiments, any mix of training images can be used as training samples. For example, in addition to synthesized training samples with realistic holes, training samples can be synthesized using a mix of random strokes. Adding random strokes to the training dataset can create a more diverse training dataset that can overcome biases towards object shaped holes.

Figure 6:
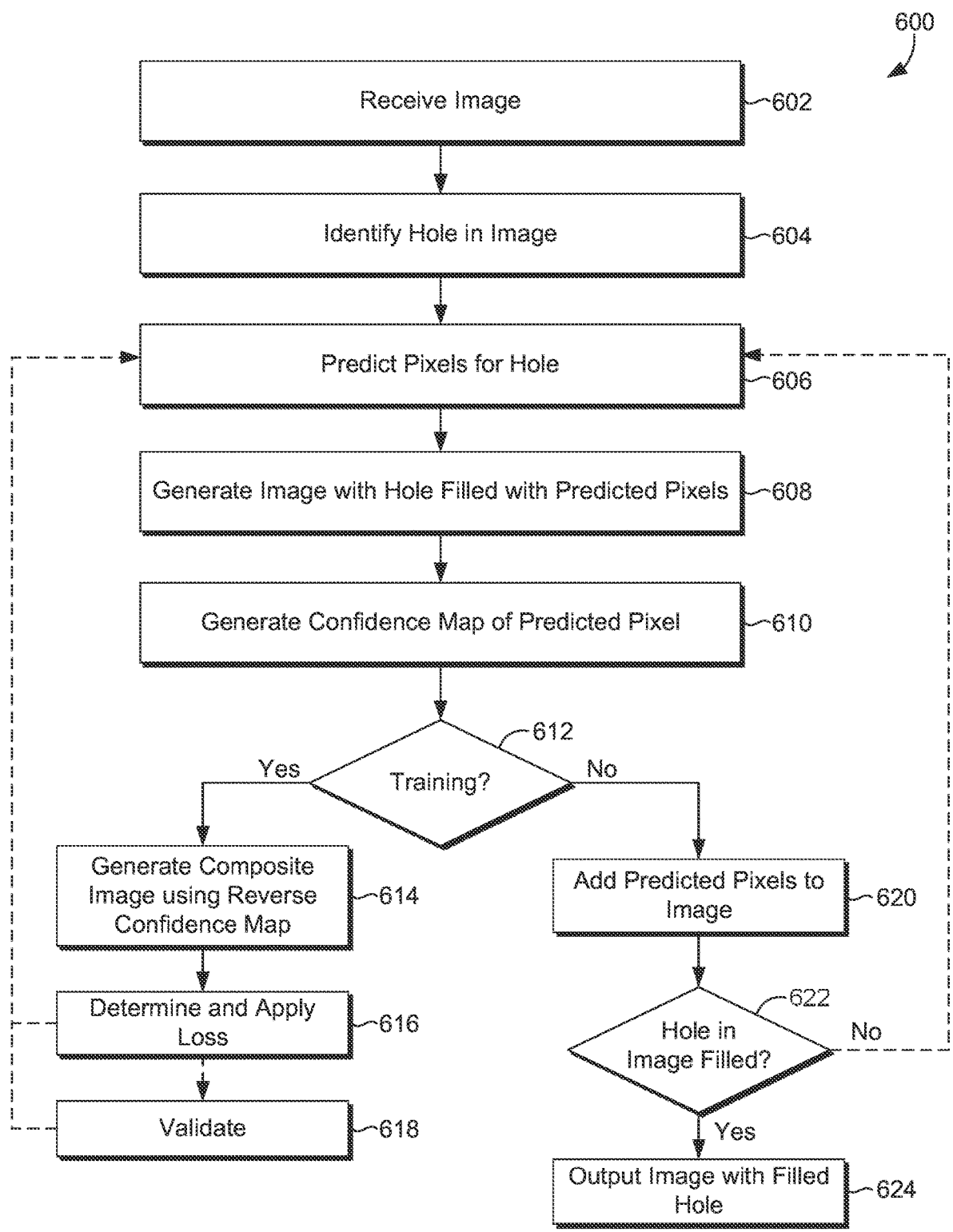
FIG. 6 depicts an example architecture used for training and/or using an image inpainting system to perform iterative image inpainting, in accordance with various embodiments of the present disclosure.

With reference to FIG. 6, a process flow is provided showing an embodiment of method 600 for training and/or using an image inpainting system to perform iterative image inpainting, in accordance with embodiments of the present disclosure. Method 600 can be performed, for example by image inpainting system 204, as illustrated in FIG. 2.

At block 602, an image is received. Such an image can be received from a group of images or pictures stored in a database, such as data store 202 of FIG. 2. In particular, a user can select or input the received image. Such an image can be selected or input in any manner. For example, a user may take a picture using a camera on a device. As another example, a user may select a desired image from a repository, for example, stored in a data store accessible by a network or stored locally at a user device.

At block 604, a hole is identified in the image. The hole can be one or more regions in the image comprising undefined pixels where information for those respective pixels is not known (e.g., holes). In some embodiments, the identification of the hole can be provided by a user. For instance, a user can indicate a region or portion of an image for editing (e.g., iterative inpainting). Such an indication can be based on a user action with the image (e.g., click, scribble, object selection, etc.). In other embodiments, the hole can be identified using a corresponding hole mask (e.g., automatically added to an image).

At block 606, pixels are predicted for the hole. Pixels can be predicted for the hole in the image (e.g., received at block 604). Pixels can be predicted using one or more trained neural networks. For instance, pixels can be predicted using a trained coarse result neural network as described herein and a trained fine result neural network as described herein. Such a coarse result neural network can receive an image (e.g., the image received at block 602) along with a corresponding hole mask (e.g., the hole in the image identified at block 604) and generate a coarse completed image (e.g., an image with the hole filled). Further, such a fine result neural network can receive the coarse completed image (e.g., generated by the coarse neural network), and a first decoder of the fine result neural network (e.g., an image decoder) can predict an inpainting image result (e.g., a fine completed image).

At block 608, an image is generated. The generated image can be the image (e.g., received at block 602) with the hole (e.g., the hole in the image identified at block 604) filled with predicted pixels (e.g., predicted at block 606). At block 610, a confidence map of the predicted pixels is generated. A confidence map can indicate a confidence value for the pixels in the image. For instance, a pixel that was not in the identified portion (e.g., the hole) of the image can have a confidence value of 1.0 (e.g., a 100% confidence value that the pixel is correct). Pixels in the identified portion (e.g., the hole) of the image can have a confidence value between 0 and 1.0 where 0 is low confidence that the predicted pixel is correct and 1.0 is high-confidence that the predicted pixel is correct. Such confidence values can be based on the training of a second decoder of the fine result neural network (e.g., a confidence decoder) which can be used to generate a corresponding confidence map of the predicted inpainting image result (e.g., from the image decoder).

At block 612, a determination is made as to whether the image inpainting system is undergoing training. When the image inpainting system is undergoing training, the process proceeds to block 614. At block 614, a composite image is generated. In particular, the composite image can be generated by compositing predicted pixels designated as low-confidence pixels with a ground-truth image. For instance, the predicted pixels designated as low-confidence pixels can be the predicted pixels that have a confidence value under 0.5. To generate the composite image, a reverse confidence map can be generated and used to designate these low-confidence pixels. In this way, low-confidence pixels from the predicted pixels can be composited with a corresponding ground-truth image (e.g., corresponding to the initial image with one or more holes input into the image inpainting system).

At block 616, loss is determined and applied. In particular, loss between the coarse completed image and a ground-truth image can be used to update the coarse result neural network. For instance, L1 reconstruction loss can be used. For the fine result neural network, L1 reconstruction loss and hinge adversarial loss with spectral normalization can be used (e.g., applied to the discriminator(s) of fine result neural network). Further, the composite image can then be analyzed to determine any error in the image inpainting system. For example, loss based on the composite image can be used to update the image inpainting system (e.g., the fine result neural network). For instance, L1 reconstruction loss and hinge adversarial loss with spectral normalization can be used. Upon determining this loss, the image inpainting system can be updated using the loss. The process of blocks 606 to 616 can be repeated for a set number of iterations for the same image. In some embodiments, this process can be repeated for two iterations for each image. In some embodiments, this overall process of blocks 602-616 can be repeated for 5000 iterations, for example.

After completing a number of training iterations, at block 618, validation is performed. Validation can be used to evaluate the machine learning model trained to perform iterative image inpainting (e.g., using the coarse and fine neural networks). In particular, validation can be used to evaluate the accuracy of the trained system. Training and validation can continue to occur until validation indicates that the performance of the system is not improving based on additional training.

Returning to block 612, when the image inpainting system is not undergoing training, the process proceeds to block 620. At block 620, predicted pixels are composited with the image. In particular, predicted pixels can be designated as known pixels based on the confidence map. For instance, predicted pixels can be designated as known pixels when they have a confidence value over 0.5. As another example, predicted pixels can be designated as known pixels when they have a confidence value higher than the confidence value of the same pixels in the previous iteration.

At block 622, a determination can be made whether the hole in the image is filled. For instance, hole(s) are filled with high-confidence pixels. In particular, after filling the hole using known pixels based on confidence values, the remaining unfilled portion(s) of the image can be designated as new holes during a subsequent iteration. When the entire hole in the image is not filled (e.g., one or more holes in the image remain unfilled), the process can repeat iterations of blocks 606-620. Such iterations can continue until the entire hole in the image has been filled with known pixels. When a determination is made that the hole in the image is filled, the process proceeds to block 624.

At block 624, the image with a filled hole is output. This image is a compilation of the original image and the known pixels determined over iterations until all the pixels in the portion of the image (e.g., hole(s)) are filled. This output image can be presented. Presentation of the output image allows a user to see and visualize the image that has undergone iterative image inpainting.

Figure 7:
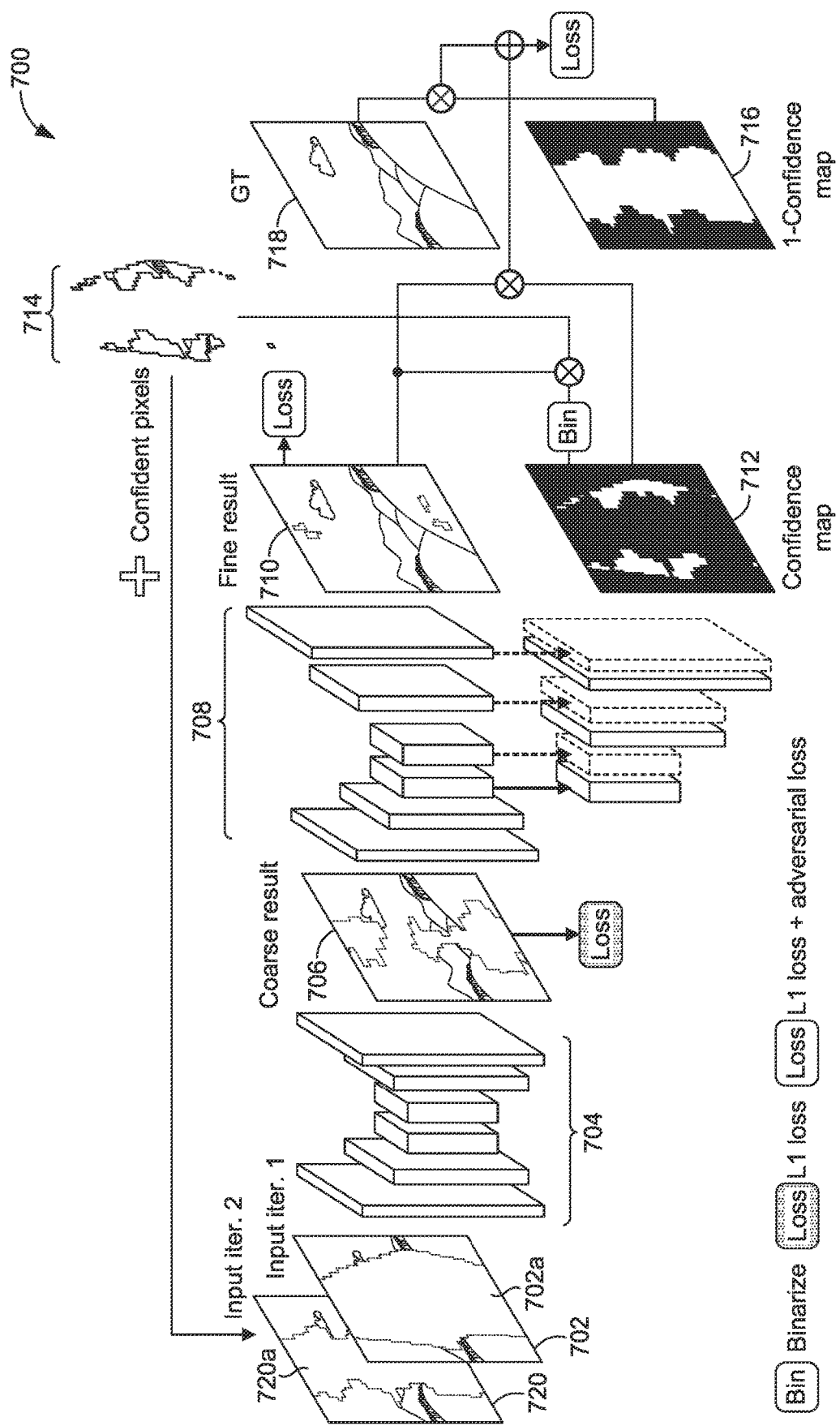
FIG. 7 illustrates an example environment that can be used for iterative inpainting method with a feedback mechanism using a confidence analysis, in accordance with embodiments of the present disclosure.

FIG. 7 illustrates an example environment 700 that can be used for iterative inpainting method with a feedback mechanism using a confidence analysis, in accordance with embodiments of the present disclosure. In particular, one or more networks based on a generative adversarial architecture can be used to perform iterative inpainting method with such a feedback mechanism. For example, the image inpainting system can be comprised of a generator comprised of coarse result neural network (e.g., an encoder and decoder) and a fine result neural network (e.g., an encoder and two decoders). The coarse result neural network, for example, can receive an incomplete image (e.g., image with a hole) along with a corresponding hole mask (e.g., a mask that designates the hole in the image) and generate a coarse completed image (e.g., an image with the hole filled). The fine result neural network, for example, can receive the coarse completed image (e.g., generated by the coarse neural network). The first decoder of the fine result neural network (e.g., an image decoder) can predict an inpainting image result (e.g., a fine completed image), and the second decoder of the fine result neural network (e.g., a confidence decoder) can generate a corresponding confidence map of the predicted inpainting image result (e.g., from the image decoder).

Image 702 can be received for image inpainting. Such an image can be received from a group of images or pictures stored in a database, such as data store 202 of FIG. 2. In particular, a user can select or input the received image. Such an image can be selected or input in any manner. For example, a user may take a picture using a camera on a device. As another example, an image can be selected from a repository, for example, stored in a data store accessible by a network or stored locally at a user device. For instance, such an image can be automatically selected. In other embodiments, such an image can be selected by a user.

Image 702 can have corresponding hole mask 702*a*. Hole mask 702*a* can be a mask that designates the hole of undefined pixels in image 702. Hole mask 702*a* can indicate one or more portions, regions, and/or objects in image 702 where inpainting is to be performed. Hole mask 702*a* can be selected or input in any manner. For example, a user may designate one or more portions, regions, and/or objects in the image. Such a hole mask can correspond to an object to remove, a scratch or blur to correct, and/or any other editing that can be performed using image inpainting.

Image 702 can be input into coarse result neural network 704. Coarse result neural network 704 can be comprised of an encoder and a decoder. From image 702, coarse result neural network 704 can generate coarse completed image 706. Coarse completed image 706 can be image 702 with the hole designated by hole mask 702*a* filled using inpainting. This coarse completed image can have low pixel values (e.g., 64×64). In embodiments when coarse result neural network 704 is undergoing training, loss can be determined based on coarse completed image 706. For instance, L1 loss can be used to update coarse result neural network 704.

Coarse completed image 706 can be input into fine result neural network 708. Fine result neural network 708 can be comprised of an encoder and two decoders. The first decoder of the fine result neural network 708 (e.g., an image decoder) can generate inpainting image result 710. Inpainting image result 710 can have high pixel values (e.g., 256×256). The second decoder of fine result neural network 708 (e.g., a confidence decoder) can generate corresponding confidence map 712 of inpainting image result 710 (e.g., from the image decoder). During training, confidence map 712 can be binarized. In particular, confidence map 712 map can be set such that predicted pixels with a pixel value over a predefined threshold (e.g., 0.5) are set as high-confidence "known" pixels (e.g., white portion), and predicted pixels with a pixel value under the predefined threshold (e.g., 0.5) are set as low-confidence pixels (e.g., black portion) that remain as undefined pixels where information is not known.

Once the image inpainting system is trained, confidence map 712 can use the pixel values determined by the system. In particular, confidence map 712 can be used to determine predicted pixels from inpainting image result 710 that are above a predefined threshold (e.g., high-confidence pixels).

High confidence pixels 714 can be used to replace the undefined pixels in the image in a subsequent iteration of inpainting. For instance, image 720 can be image 702 with high confidence pixels 714 added such that hole mask 720a is smaller than hole mask 702a.

In some embodiments, such as during training, an additional adversarial network can be used to analyze inpainting image result 710. For instance, the adversarial network can receive inpainting image result 710 or a ground-truth image and output a classification for each patch of the input image as real or fake. Such a classification can be a score map where each element corresponds to a local region of an input image covered by its receptive field.

During training, a composite image can be generated using reverse confidence map 716 and ground-truth image 718. Reverse confidence map 716 can be low-confidence pixels that have a confidence value under 0.5. In this way, reverse confidence map 716 can be used to designate these low-confidence pixels from inpainting image result 710. In this way, low-confidence pixels from inpainting image result 710 can be composited with corresponding ground-truth image 718 (e.g., corresponding to the initial image with one or more holes input into the image inpainting system). This composite image can then be analyzed to determine any error in the image inpainting system. For example, loss based on the composite image can be used to update the image inpainting system (e.g., the fine result neural network). For instance, L1 reconstruction loss and hinge adversarial loss with spectral normalization can be used.

Figure 8A:
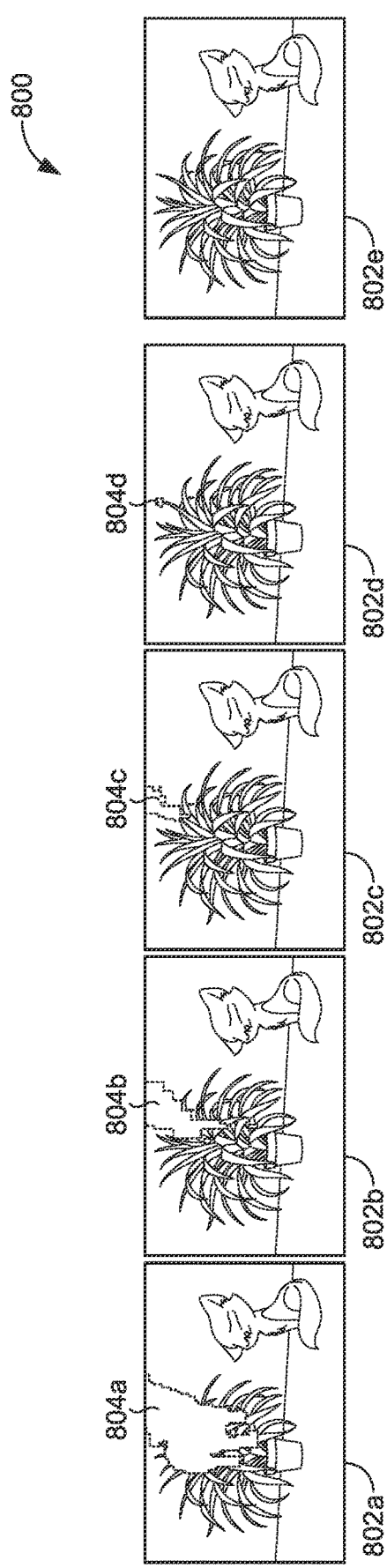
FIGS. 8A-8B illustrate example iterative image inpainting results using confidence analysis, in accordance with embodiments of the present disclosure.
Figure 8B:
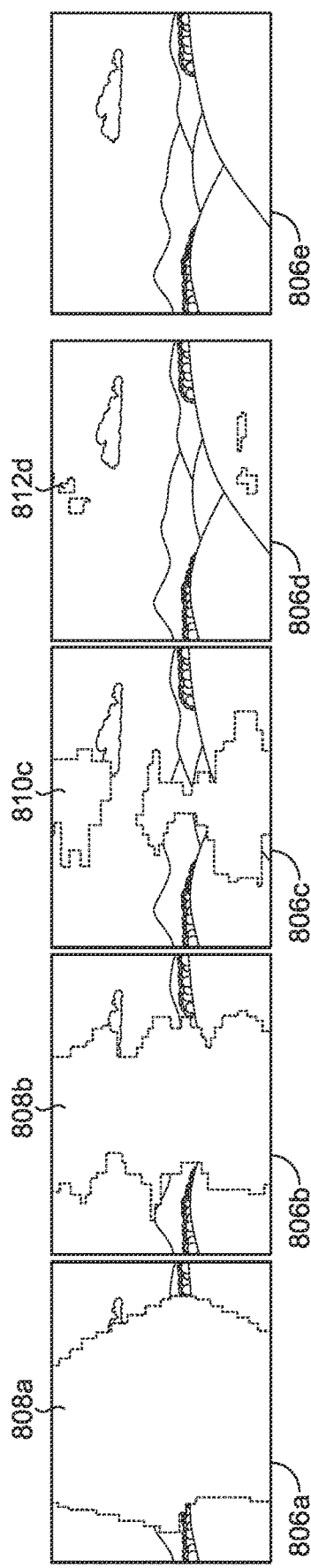

FIGS. 8A-8B illustrate example iterative image inpainting results using confidence analysis, in accordance with embodiments of the present disclosure. FIG. 8A is an illustrative example of a series of network inputs with shrinking holes and corresponding outputs over iterations of inpainting. For instance, image 802 can be input into an image inpainting system. In a first iteration of the image inpainting system, image 802a can be analyzed along with hole 804a. In this first iteration, the image inpainting system can predict pixel information for undefined pixels of hole 804a using methods as described herein. In a second iteration of the image inpainting system, image 802b can be analyzed along with hole 804b. Image 802b can be image 802a with high-confidence predicted pixels from the first iteration used to fill some of the undefined pixels of hole 804a. In the second iteration, the image inpainting system can predict pixel information for undefined pixels of hole 804b using methods as described herein. In a second iteration of the image inpainting system, image 802c can be analyzed along with hole 804c. Image 802c can be image 802b with high-confidence predicted pixels from the second iteration used to fill some of the undefined pixels of hole 804b. In the third iteration, the image inpainting system can predict pixel information for undefined pixels of hole 804c using methods as described herein. In a fourth iteration of the image inpainting system, image 802d can be analyzed along with hole 804d. Image 802d can be image 802c with high-confidence predicted pixels from the third iteration used to fill some of the undefined pixels of hole 804c. In the fourth iteration, the image inpainting system can predict pixel information for undefined pixels of hole 804d using methods as described herein. Following this forth iteration, image 802e can be output.

Figure 9:
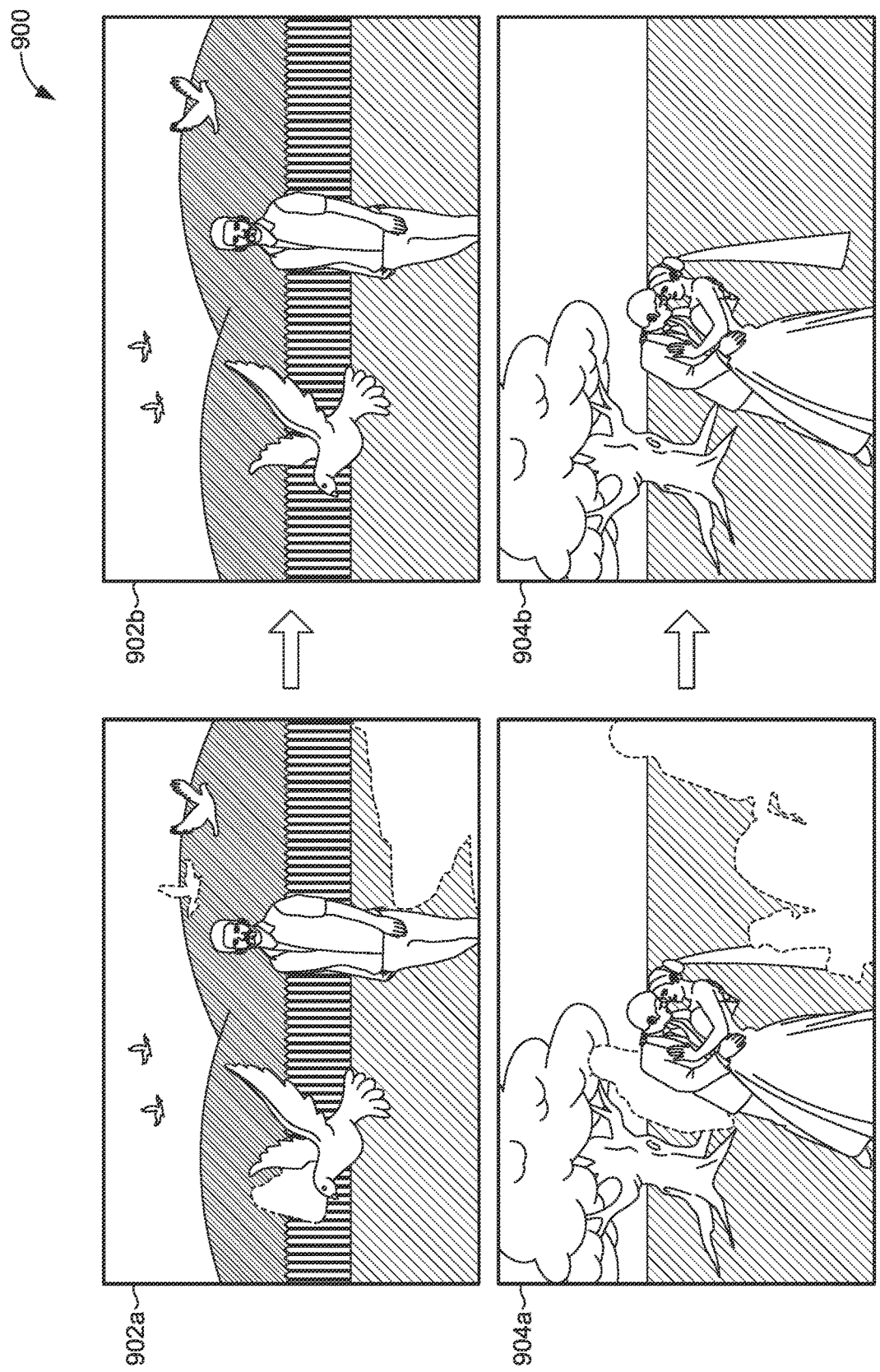
FIG. 9 illustrates example iterative image inpainting results using an image inpainting system with a confidence analysis feedback mechanism, in accordance with embodiments of the present disclosure.

FIG. 8B is an illustrative example of a series of network inputs with shrinking holes and corresponding outputs over iterations of inpainting. For instance, image 806 can be input into an image inpainting system. In a first iteration of the image inpainting system, image 806a can be analyzed along with hole 808a. In this first iteration, the image inpainting system can predict pixel information for undefined pixels of hole 808a using methods as described herein. In a second iteration of the image inpainting system, image 806b can be analyzed along with hole 808b. Image 806b can be image 806a with high-confidence predicted pixels from the first iteration used to fill some of the undefined pixels of hole 808a. In the second iteration, the image inpainting system can predict pixel information for undefined pixels of hole 808b using methods as described herein. In a second iteration of the image inpainting system, image 806c can be analyzed along with hole 808c. Image 806c can be image 806b with high-confidence predicted pixels from the second iteration used to fill some of the undefined pixels of hole 808b. In the third iteration, the image inpainting system can predict pixel information for undefined pixels of hole 808c using methods as described herein. In a fourth iteration of the image inpainting system, image 806d can be analyzed along with hole 808d. Image 806d can be image 806c with high-confidence predicted pixels from the third iteration used to fill some of the undefined pixels of hole 808c. In the fourth iteration, the image inpainting system can predict pixel information for undefined pixels of hole 808d using methods as described herein. Following this forth iteration, image 806e can be output FIG. 9 illustrates example iterative image inpainting results using an image inpainting system with a confidence analysis feedback mechanism, in accordance with embodiments of the present disclosure. For instance, image 902a can be input into an image inpainting system along with one or more regions in an image with undefined pixels where information for those respective pixels is not known (e.g., holes). The image inpainting system can then generate image 902b using methods as described herein. As another example, image 904a can be input into an image inpainting system along with one or more regions in an image with undefined pixels where information for those respective pixels is not known (e.g., holes). The image inpainting system can then generate image 904b using methods as described herein.

Figure 10:
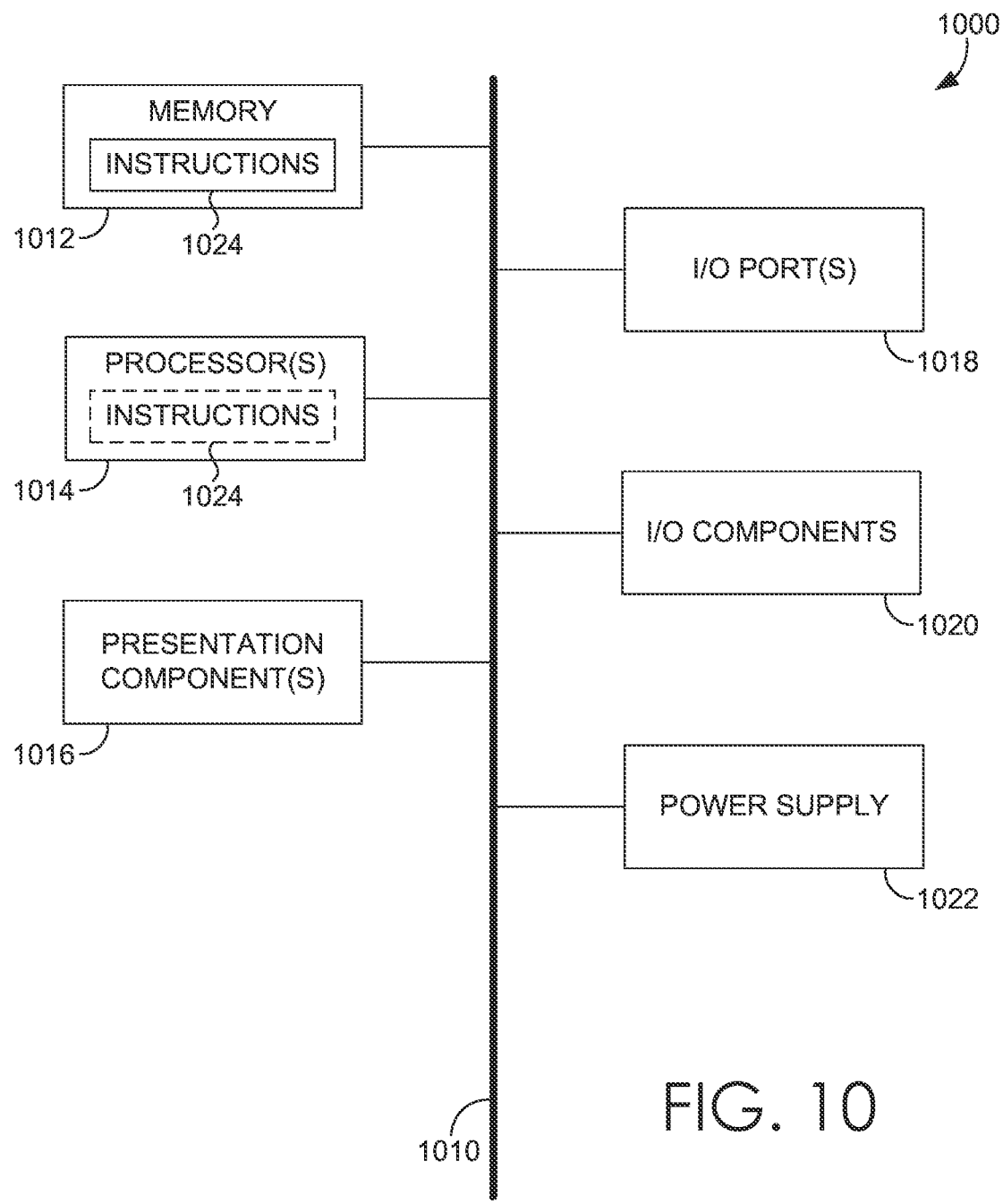
FIG. 10 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 10, an illustrative operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory Computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method comprising:
generating an output image from an image by iteratively:
predicting, using at least one machine learning model, pixel information for undefined pixels in an identified portion of the image;
identifying, using the at least one machine learning model, one or more of the undefined pixels having predicted pixel information with a confidence value that exceeds a confidence threshold;
updating the one or more of the undefined pixels with corresponding predicted pixel information; and
analyzing the undefined pixels in the identified portion of the image after updating the one or more of the undefined pixels to determine remaining undefined pixels in the identified portion of the image.

2. The computer-implemented method of claim 1, further comprising:
analyzing, using the at least one machine learning model, the pixel information used for updating the one or more of the undefined pixels during a first iteration; and
reevaluating one or more of the undefined pixels having predicted pixel information with a confidence value that does not exceed the confidence threshold, during a second iteration subsequent to the first iteration.

3. The computer-implemented method of claim 1, wherein updating the one or more of the undefined pixels with the corresponding predicted pixel information comprises iteratively replacing the one or more of the undefined pixels based on the corresponding predicted pixel information.

4. The computer-implemented method of claim 1, wherein the confidence threshold is based on the confidence value having a value greater than a previous confidence value identified in a previous iteration.

5. The computer-implemented method of claim 1, wherein the at least one machine learning model is trained using training data comprising one or more of:
a first set of synthesized training samples with realistic holes, and
a second set of synthesized training samples with a mix of random strokes as holes.

6. The computer-implemented method of claim 1, wherein identifying the one or more of the undefined pixels having predicted pixel information with the confidence value that exceeds the confidence threshold comprises:
analyzing a confidence map that comprises confidence values based on a likelihood of error of the predicted pixel information; and
determining pixels where the confidence value exceeds the confidence threshold based on the confidence map.

7. The computer-implemented method of claim 1, wherein the at least one machine learning model comprises a confidence decoder trained to compute the confidence value for the pixel information for each of the undefined pixels.

8. A system comprising: a memory component; and one or more processing devices coupled to the memory component, the one or more processing devices to perform operations comprising: receiving an image comprising undefined pixels; predicting, using at least one machine learning model, pixel information for the undefined pixels; identifying, using the at least one machine learning model, one or more of the undefined pixels having predicted pixel information with a confidence value that exceeds a confidence threshold; generating an output image from the image based on iteratively updating the one or more of the undefined pixels with corresponding predicted pixel information; and analyzing the undefined pixels in an identified portion of the image after updating the one or more of the undefined pixels to determine remaining undefined pixels in the identified portion of the image.

9. The system of claim 8, wherein the confidence threshold is based on the confidence value having a value greater than a previous confidence value identified in a previous iteration.

10. The system of claim 8, the operations further comprising:
analyzing, using the at least one machine learning model, the pixel information used for updating the one or more of the undefined pixels during a first iteration; and
reevaluating one or more of the undefined pixels having predicted pixel information with a confidence value that does not exceed the confidence threshold during a second iteration subsequent to the first iteration.

11. The system of claim 8, wherein identifying the one or more of the undefined pixels having predicted pixel information with the confidence value that exceeds the confidence threshold comprises:
analyzing a confidence map that comprises confidence values based on a likelihood of error of the predicted pixel information; and
determining pixels where the confidence value exceeds the confidence threshold based on the confidence map.

12. The system of claim 8, wherein the at least one machine learning model comprises a confidence decoder trained to compute the confidence value for the pixel information for each of the undefined pixels.

13. A method comprising:
receiving a training dataset including an image comprising undefined pixels;
training at least one machine learning model, using the training dataset, to compute predicted pixel information for the undefined pixels, the predicted pixel information including a confidence value;
training the at least one machine learning model to identify one or more of the undefined pixels having predicted pixel information with a confidence value that exceeds a confidence threshold; and
training the at least one machine learning model with a feedback mechanism using a composite image generated by compositing one or more of the undefined pixels having predicted pixel information with the confidence value that does not exceed the confidence threshold with a ground-truth image.

14. The method of claim 13, further comprising:
iteratively updating the one or more of the undefined pixels with corresponding predicted pixel information.

15. The method of claim 13, wherein the training dataset comprises one or both of:
a first set of synthesized training samples with realistic holes, and
a second set of synthesized training samples with a mix of random strokes as holes.

16. The method of claim 13, further comprising:
- updating the at least one machine learning model using a first loss based on a coarse completed image and a ground-truth image, wherein the coarse completed image is a first image with one or more identified portions filled with a first set of pixels predicted using the at least one machine learning model;
- updating the at least one machine learning model using a second loss based on an inpainting image result and the ground-truth image, wherein the inpainting image result is a second image with the one or more identified portions filled with a second set of pixels predicted using the at least one machine learning model; and
- updating the at least one machine learning model using a third loss based on a composite image and the ground-truth image, wherein the composite image is a third image comprised of compositing low-confidence pixels predicted using the at least one machine learning model with the ground-truth image.

17. The method of claim 16, wherein the second loss further comprises a first adversarial loss based on the inpainting image result and the third loss further comprises a second adversarial loss based on the composite image.

* * * * *